US012748204B2

United States Patent

(12) United States Patent
Tao

(10) Patent No.: US 12,748,204 B2
(45) Date of Patent: Sep. 29, 2026

(54) POSITIONINING MEASUREMENT METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Xuhua Tao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 308 days.

(21) Appl. No.: 18/573,830

(22) PCT Filed: Jun. 29, 2021

(86) PCT No.: PCT/CN2021/103239
§ 371 (c)(1),
(2) Date: Dec. 22, 2023

(87) PCT Pub. No.: WO2023/272513
PCT Pub. Date: Jan. 5, 2023

(65) Prior Publication Data
US 2024/0288570 A1 Aug. 29, 2024

(51) Int. Cl.
*G01S 13/76* (2006.01)
*H04W 64/00* (2009.01)

(52) U.S. Cl.
CPC ........... *G01S 13/765* (2013.01); *H04W 64/00* (2013.01)

(58) Field of Classification Search
CPC ...... G01S 13/765; H04W 64/00; H04W 24/00
See application file for complete search history.

(56) References Cited

U.S. PATENT DOCUMENTS 8,929,918 B2 * 1/2015 Siomina ................ H04W 4/029 455/456.2
8,965,414 B2 2/2015 Siomina et al.
9,119,036 B2 8/2015 Siomina et al.
9,414,349 B2 8/2016 Siomina et al.
9,635,637 B2 4/2017 Siomina et al.
(Continued)

FOREIGN PATENT DOCUMENTS

CN 102457960 A 5/2012
CN 103039108 A 4/2013
(Continued)

OTHER PUBLICATIONS

State Intellectual Property Office of the People's Republic of China, Office Action and Search Report Issued in Application No. 2021800020037, Jul. 4, 2025, 18 pages. (Submitted with Machine/Partial Translation).
(Continued)

*Primary Examiner* — Olumide Ajibade Akonai
*Assistant Examiner* — Peter Davon Doze
(74) *Attorney, Agent, or Firm* — Arch & Lake LLP

(57) ABSTRACT

Embodiments of the present disclosure provide a positioning measurement method, where the method is performed by a positioning server, and the method includes: sending measurement assistance information to a serving base station of a terminal, where the measurement assistance information is used by the serving base station to determine a measurement gap of positioning measurement performed by the terminal by using a pre-determined manner.

20 Claims, 11 Drawing Sheets

(56) References Cited

U.S. PATENT DOCUMENTS

| | | | | |
|---|---|---|---|---|
| 9,867,160 | B2 | 1/2018 | Siomina et al. | |
| 10,237,844 | B2 | 3/2019 | Siomina et al. | |
| 2004/0185870 | A1 | 9/2004 | Matsuda | |
| 2013/0059610 | A1* | 3/2013 | Siomina | H04W 64/00 455/456.6 |
| 2014/0094188 | A1* | 4/2014 | Kazmi | H04W 4/023 455/456.1 |
| 2015/0141047 | A1 | 5/2015 | Siomina et al. | |
| 2016/0316447 | A1 | 10/2016 | Siomina et al. | |
| 2017/0201961 | A1 | 7/2017 | Siomina et al. | |
| 2018/0132204 | A1 | 5/2018 | Siomina et al. | |
| 2020/0169831 | A1 | 5/2020 | Li et al. | |
| 2020/0264261 | A1 | 8/2020 | Akkarakaran et al. | |
| 2021/0385766 | A1* | 12/2021 | Manolakos | H04W 52/0216 |
| 2022/0039056 | A1* | 2/2022 | Manolakos | H04W 24/10 |
| 2023/0188288 | A1* | 6/2023 | Lee | H04L 5/0023 370/329 |

FOREIGN PATENT DOCUMENTS

| | | | |
|---|---|---|---|
| CN | 110166501 | A | 8/2019 |
| WO | 2019023905 | A1 | 2/2019 |

OTHER PUBLICATIONS

ISA State Intellectual Property Office of the People's Republic of China, Written Opinion of the International Searching Authority Issued in Application No. PCT/CN2021/103239, Mar. 23, 2022, WIPO, 9 pages.

ZTE, "Discussion on latency reduction for NR positioning", R1-2104593, 3GPP TSG RAN WG1 #105-e, e-Meeting, May 10-27, 2021, 5 pages.

ISA State Intellectual Property Office of the People's Republic of China, International Search Report Issued in Application No. PCT/CN2021/103239, dated Mar. 23, 2022, with English translation,(6p).

Sony "Considerations on Latency Improvements for DL and DL+UL positioning methods""3GPP TSG RAN WG1 #105-e R1-2105171 e-Meeting, May 10-May 27, 2021", 3 pages.

CATT "Discussion on latency improvements for both DL and DL+UL positioning methods""3GPP TSG RAN WG1 Meeting #105-e R1-2104523e-Meeting, May 19-27, 2021" May 12, 2021, 7 pages.

State Intellectual Property Office of the People's Republic of China, Office Action and Search Report Issued in Application No. 2021800020037, Feb. 27, 2026, 10 pages. (Submitted with English Translation).

* cited by examiner

POSITIONINING MEASUREMENT METHOD AND APPARATUS, COMMUNICATION DEVICE, AND STORAGE MEDIUM

CROSS-REFERENCE TO RELATED APPLICATIONS

This application is a national stage of international application No. PCT/CN2021/103239, filed on Jun. 29, 2021, which is hereby incorporated by reference in its entirety.

TECHNICAL FIELD

The present disclosure relates to, but is not limited to, the technical field of wireless communication, and in particular, to a positioning measurement method and apparatus, a communication device and a storage medium.

BACKGROUND

Release 16 (R16) of the 5th generation mobile networks (5G) introduces a variety of terminal positioning technologies, where all of the variety of terminal positioning technologies can realize terminal positioning. When a network needs to position a terminal, a location management function (LMF) may send a position request to the terminal. When receiving the position request, the terminal completes positioning measurement, and reports a positioning measurement result or position information of the terminal to complete a positioning procedure of the terminal.

In release 17 (R17) of the 5G, a shorter time delay requirement is proposed. Thus, it is necessary to further reduce the time delay of terminal positioning technology to meet service requirement and improve user experience.

SUMMARY

Embodiments of the present disclosure provide a positioning measurement method and apparatus, a communication device and a storage medium.

According to a first aspect of the embodiments of the present disclosure, a positioning measurement method is provided, where the method is performed by a positioning server, and the method includes:

sending measurement assistance information to a serving base station of a terminal, where the measurement assistance information is used by the serving base station to determine a measurement gap of positioning measurement performed by the terminal by using a pre-determined manner.

In an embodiment, sending measurement assistance information to a serving base station of a terminal includes:

sending the measurement assistance information to the serving base station by using a provide assistance data message.

In an embodiment, the method further includes:

sending request capability information of the positioning measurement to the terminal, where the request capability information is used to request that the terminal supports or does not support capability of performing the positioning measurement by using the pre-determined manner.

In an embodiment, sending request capability information of the positioning measurement to the terminal includes:

sending the request capability information of the positioning measurement to the terminal by using a request capability information message.

In an embodiment, the method further includes:

receiving feedback information sent by the terminal in response to the request capability information, where the feedback information is used to indicate that the terminal supports or does not support performing the positioning measurement by using the pre-determined manner.

In an embodiment, receiving feedback information sent by the terminal in response to the request capability information includes:

receiving feedback information sent by the terminal in response to the request capability information by using a provide capability message.

In an embodiment, the feedback information includes a cell identifier of the serving base station.

In an embodiment, the feedback information further includes at least one of:

information of the supported pre-determined manner;

frequency band information of a supported frequency band; or information of supporting or not supporting the pre-determined manner.

In an embodiment, the measurement assistance information includes at least one of measurement reference cell configuration information or adjacent cell configuration information.

In an embodiment, the method further includes:

sending the measurement assistance information to the terminal.

In an embodiment, the method further includes:

sending a request location information message of the positioning measurement to the terminal, where the request location information message is used to trigger the terminal to perform the positioning measurement by using the pre-determined manner.

According to a second aspect of the embodiments of the present disclosure, a positioning measurement method is provided, where the method is performed by a base station, and the method includes:

receiving measurement assistance information sent by a positioning server, where the measurement assistance information is used by the base station to determine a measurement gap of positioning measurement performed by a terminal by using a pre-determined manner.

In an embodiment, receiving measurement assistance information sent by a positioning server includes:

receiving the measurement assistance information sent by the positioning server by using a provide assistance data message.

In an embodiment, the method further includes:

determining, according to the measurement assistance information, the measurement gap of the positioning measurement performed by the terminal by using the pre-determined manner.

In an embodiment, the method further includes:

sending configuration information to the terminal, where the configuration information at least indicates the measurement gap.

In an embodiment, sending configuration information to the terminal includes:

sending the configuration information to the terminal by using a radio resource control (RRC) message.

In an embodiment, the measurement assistance information includes at least one of measurement reference cell configuration information or adjacent cell configuration information.

According to a third aspect of the embodiments of the present disclosure, a positioning measurement method is provided, where the method is performed by a terminal, and the method includes:

sending feedback information to a positioning server, where the feedback information is used to indicate that the terminal supports or does not support performing positioning measurement by using a pre-determined manner; the feedback information includes a cell identifier of a serving base station of the terminal.

In an embodiment, sending feedback information to a positioning server includes:

sending feedback information to a positioning server by using a provide capability message.

In an embodiment, the feedback information further includes at least one of:

information of the supported pre-determined manner;

frequency band information of a supported frequency band; or information of supporting or not supporting the pre-determined manner.

In an embodiment, receiving request capability information of the positioning measurement sent by the positioning server, where the request capability information is used to request that the terminal supports or does not support capability of performing the positioning measurement by using the pre-determined manner.

In an embodiment, receiving request capability information of the positioning measurement sent by the positioning server includes:

receiving request capability information of the positioning measurement sent by the positioning server by using a request capability information message.

In an embodiment, the method further includes:

receiving configuration information sent by the serving base station, where the configuration information at least indicates the measurement gap of the positioning measurement performed by the terminal by using the pre-determined manner.

In an embodiment, the method further includes:

performing the positioning measurement by using the pre-determined manner according to the measurement gap.

In an embodiment, the method further includes:

receiving a request location information message of the positioning measurement sent by the positioning server, where the request location information message is used to trigger the terminal to perform the positioning measurement by using the pre-determined manner.

In an embodiment, the method further includes:

receiving the measurement assistance information sent by the positioning server.

In an embodiment, the measurement assistance information includes at least one of measurement reference cell configuration information or adjacent cell configuration information.

According to a fourth aspect of the embodiments of the present disclosure, a positioning measurement apparatus is provided, where apparatus includes:

a sending module, configured to send measurement assistance information to a serving base station of a terminal, where the measurement assistance information is used by the serving base station to determine a measurement gap of positioning measurement performed by the terminal by using a pre-determined manner.

According to a fifth aspect of the embodiments of the present disclosure, a positioning measurement apparatus is provided, where the apparatus includes:

a receiving module, configured to receive measurement assistance information sent by a positioning server, where the measurement assistance information is used by a base station to determine a measurement gap of positioning measurement performed by a terminal by using a pre-determined manner.

According to a sixth aspect of the embodiments of the present disclosure, a positioning measurement apparatus is provided, where apparatus includes:

a sending module, configured to send feedback information to a positioning server, where the feedback information is used to indicate that a terminal supports or does not support performing positioning measurement by using a pre-determined manner; the feedback information includes a cell identifier of a serving base station of the terminal.

According to a seventh aspect of the embodiments of the present disclosure, a communication device is provided, where the apparatus includes:

a processor; and a memory for storing an instruction executable by the processor;

where the processor is configured to: execute the instruction to implement the method according to any embodiment of the present disclosure.

According to an eighth aspect of the embodiments of the present disclosure, a computer storage medium is provided, where the computer storage medium stores a computer-executable program, and the computer-executable program is executed by a processor to implement the method according to any embodiment of the present disclosure.

In the embodiments of the present disclosure, measurement assistance information is sent to a serving base station of a terminal, where the measurement assistance information is used by the serving base station to determine a measurement gap of positioning measurement performed by the terminal by using a pre-determined manner. The positioning server can directly send the measurement assistance information to the serving base station of the terminal. After receiving the measurement assistance information, the serving base station of the terminal can determine the measurement gap of the positioning measurement performed by the terminal by using the pre-determined manner, compared to a way that the positioning server needs to send the measurement assistance information to the terminal and then the terminal sends the measurement assistance information to the base station, transmission delay of the measurement assistance information is reduced. In such way, a time delay of the terminal positioning method can be reduced, thereby improving user experience.

DETAILED DESCRIPTION

Figure 1:
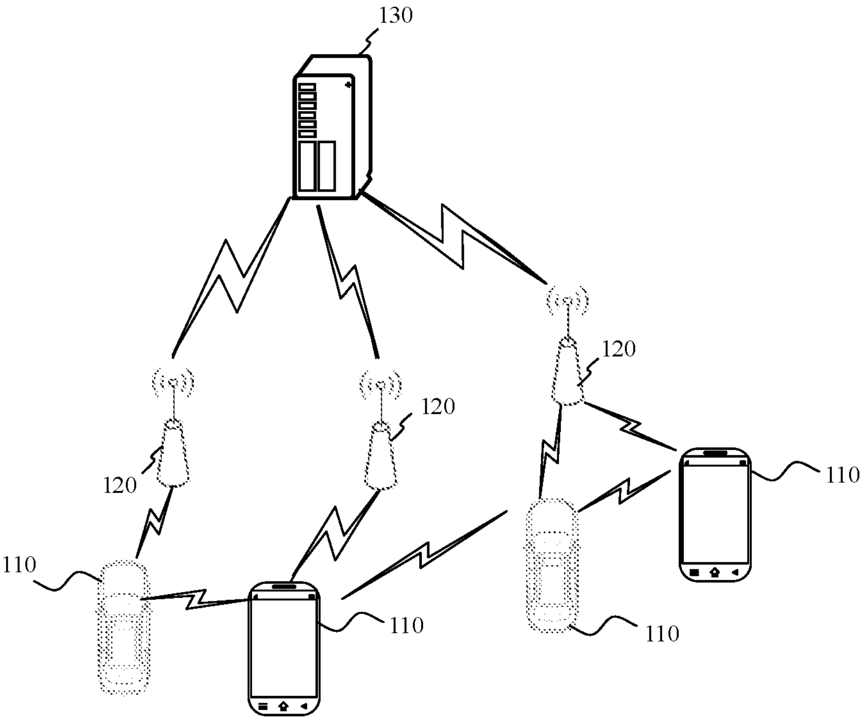
FIG. 1 is a schematic structural diagram of a wireless communication system according to an exemplary embodiment.

Description will now be made in detail to illustrative embodiments, examples of which are shown in the accompanying drawings. When the following description refers to the drawings, unless otherwise indicated, same reference numerals in different drawings indicate the same or similar elements. Embodiments described in the following illustrative embodiments do not represent all embodiments consistent with the present disclosure. In contrary, they are merely examples of apparatuses and methods consistent with some aspects of the embodiments of the present disclosure.

The terminologies used in the embodiments of the present disclosure are for the purpose of describing specific embodiments only and are not intended to limit the embodiments of the present disclosure. Singular forms "a" and "said" used in the specification of the embodiments of the present disclosure and the appended claims are also intended to include plural forms, unless the context clearly indicates other meaning. It should also be understood that the term "and/or" as used herein refers to and includes any or all possible combinations of one or more associated listed items.

It should be understood that although the terms "first", "second", "third", etc., may be used to describe various information in the embodiments of the present disclosure, these information should not be limited to these terms. These terms are only used to distinguish a same type of information from each other. For example, without departing from the scope of the embodiments of the present disclosure, first information may also be referred to as second information, and similarly, second information may also be referred to as first information. Depending on context, word "if" as used herein can be interpreted as "when" or "upon" or "in response to determining".

For the sake of conciseness and easy understanding, terms "greater than" or "less than" are used to represent a large-small relation. But for those of ordinary skills in the art, it shall be understood that the term "greater than" also represents "greater than or equal to", and "less than" also represents "less than or equal to".

As shown in FIG. 1, FIG. 1 shows a schematic structural diagram of a wireless communication system provided by an embodiment of the present disclosure. As shown in FIG. 1, the wireless communication system is a communication system based on mobile communication technology, and the wireless communication system may include: several user equipments 110 and several base stations 120.

The user equipment 110 may be a device that provides voice and/or data connectivity to users. The user equipment 110 can communicate with one or more core networks via a Radio Access Network (RAN). The user equipment 110 can be an Internet of Things user equipment, such as a sensor device, a mobile phone, and a computer with an Internet of Things user equipment, for example, a fixed, portable, pocket-sized, hand-held, computer-built or vehicle-mounted device. For example, a station (STA), a subscriber unit, a subscriber station, a mobile station, a mobile, a remote station, an access point, a remote terminal, an access terminal, a user terminal, a user agent, a user device or a user equipment. Alternatively, the user equipment 110 may be an unmanned aerial vehicle device. Alternatively, the user equipment 110 may be a vehicle-mounted device, such as a vehicle computer with wireless communication functions, or a wireless user equipment externally connected to a vehicle computer. Alternatively, the user equipment 110 can also be a roadside equipment, for example, a street lamp, a signal lamp or other roadside equipment with wireless communication functions.

The base station 120 may be a network-side device in a wireless communication system. The wireless communication system may be a 4th generation mobile communication (4G) system, also known as a Long Term Evolution (LTE) system. Alternatively, the wireless communication system can also be a 5G system, also known as a new air interface system or a 5G NR system. Alternatively, the wireless communication system can also be a next generation system of the 5G system. The access network in the 5G system can be referred to as NG-RAN (new generation-radio access network).

The base station 120 may be an evolved base station (eNB) adopted in the 4G system. Alternatively, the base station 120 may also be a base station (gNB) adopting a centralized and distributed architecture in the 5G system. When the base station 120 adopts a centralized and distributed architecture, the base station 120 usually includes a central unit (CU) and at least two distributed units (DU). The central unit is provided with a protocol stack of Packet Data Convergence Protocol (PDCP) layer, Radio Link Control Protocol (RLC) layer and Media Access Control (MAC) layer; the distributed unit is provided with a protocol stack of physical (PHY) layer, and the embodiments of the present disclosure do not limit the specific implementation of the base station 120.

A wireless connection can be established between the base station 120 and the user equipment 110 through a wireless air interface. In different embodiments, the wireless air interface is based on the fourth generation mobile communication network technology (4G) standard; alternatively, the wireless interface is based on the fifth generation mobile communication network technology (5G) standard, for example, the wireless interface is a new interface; alternatively, the wireless air interface can also be a wireless air interface based on the technical standard of the next generation mobile communication network of 5G.

In some embodiments, an E2E (End to End) connection can also be established between the user equipments 110. For example, communication scenarios such as V2V (vehicle to vehicle) communication, V2I (vehicle to Infrastructure) communication and V2P(vehicle to pedestrian) communication in vehicle to everything (V2X) communication.

The user equipment described above can be considered as a terminal device in the following embodiments.

In some embodiments, the wireless communication system may further include a network management device 130.

Several base stations 120 are connected to the network management device 130 respectively. The network management device 130 may be a core network device in a wireless communication system. For example, the network management device 130 may be a Mobility Management Entity (MME) in an Evolved Packet Core (EPC). Alternatively, the network management device 130 can also be other core network devices, such as Serving GateWay (SGW), Public Data Network GateWay (PGW), Policy and Charging Rules Function (PCRF) or Home Subscriber Server (HSS), etc. The embodiments of the present disclosure do not limit an implementation form of the network management device 130.

In order to facilitate understanding by those skilled in the art, the embodiments of the present disclosure list a plurality of embodiments to clearly describe the technical solution of the embodiments of the present disclosure. Certainly, those skilled in the art can understand that the embodiments provided by the embodiments of the present disclosure can be executed independently, or combined with the methods of other embodiments of the embodiments of the present disclosure, or together with some methods of other related technologies, which is not limited by the embodiments of the present disclosure.

In order to better understand the technical solution disclosed in the embodiments of the present disclosure, the application scenarios of terminal positioning are described below.

In an embodiment, when a positioning server requires a terminal to perform measurements related to location information, for example, measurement of Reference Signal Time Difference (RSTD), and when the terminal needs a measurement gap to complete the related measurement, the terminal needs to report positioning measurement configuration information of the measurement gap to a serving cell, and then the serving cell configures the measurement gap according to the reported positioning measurement configuration information.

Figure 2:
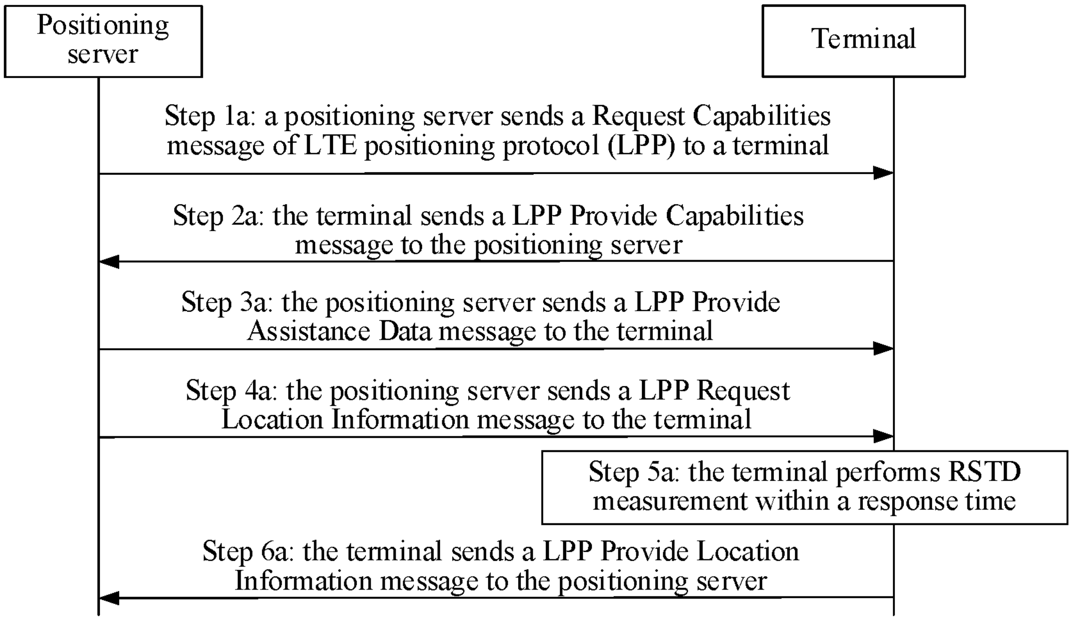
FIG. 2 is a schematic flowchart of a positioning measurement method according to an exemplary embodiment.

In an embodiment, as shown in FIG. 2, a procedure of the positioning measurement includes:

Step 1a: a positioning server sends a Request Capabilities message of LTE positioning protocol (LPP) to a terminal;

Step 2a: the terminal sends a LPP Provide Capabilities message to the positioning server;

Step 3a: the positioning server sends a LPP Provide Assistance Data message to the terminal;

Step 4a: the positioning server sends a LPP Request Location Information message to the terminal;

Step 5a: the terminal performs RSTD measurement within a response time;

Step 6a: the terminal sends a LPP Provide Location Information message to the positioning server.

Figure 3:
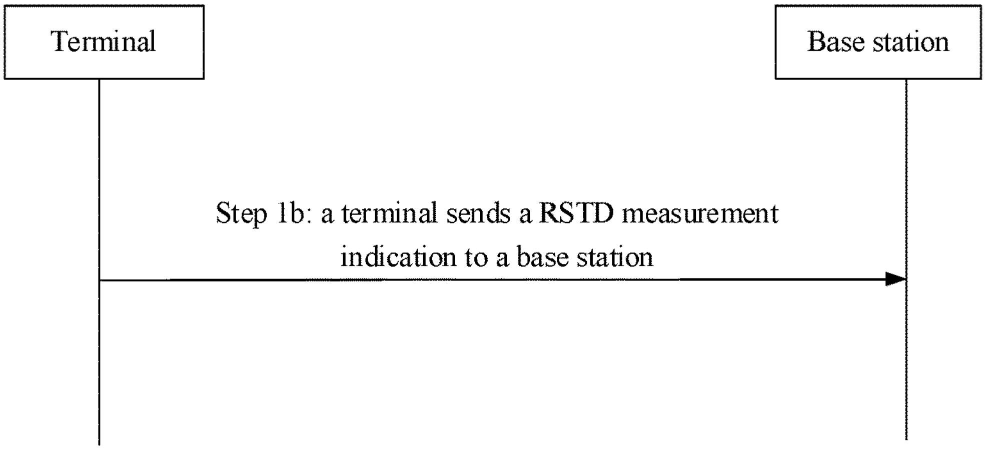
FIG. 3 is a schematic flowchart of a positioning measurement method according to an exemplary embodiment.

In an embodiment, as shown in FIG. 3, the procedure that the terminal reports the positioning measurement configuration information of the measurement gap to the cell includes:

Step 1b: the terminal sends a RSTD measurement indication (InterFreqRSTDMeasurementIndication) to the base station. The RSTD measurement indication may include the positioning measurement configuration information.

The above-described procedure has a long measurement delay, and in order to improve efficiency and performance of the positioning measurement, a procedure that can reduce the positioning measurement delay needs to be researched.

Figure 4:
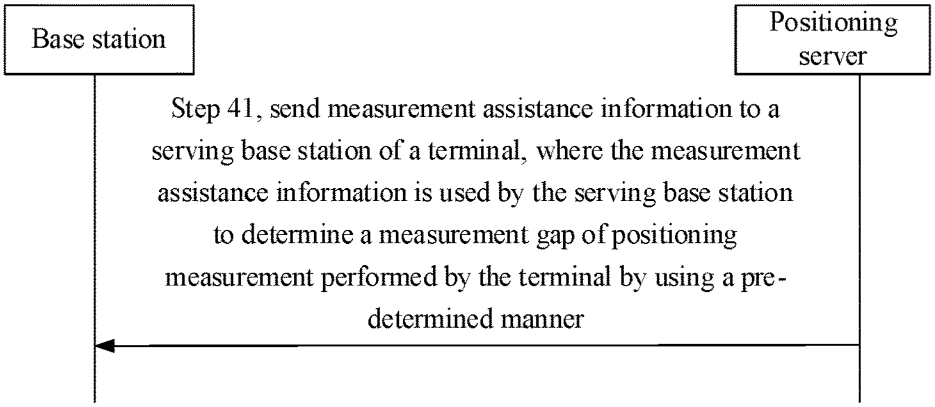
FIG. 4 is a schematic flowchart of a positioning measurement method according to an exemplary embodiment.

As shown in FIG. 4, the present embodiment provides a positioning measurement method, performed by a positioning server, including:

Step 41, sending measurement assistance information to a serving base station of a terminal, where the measurement assistance information is used by the serving base station to determine a measurement gap of positioning measurement performed by the terminal by using a pre-determined manner.

The positioning server may be a core network device. The positioning server may be a positioning management function (location management function, LMF) in a core network. It shall be noted that the positioning server may also be other function entities in the core network.

The terminal may be a device with wireless receiving and sending function. The terminal may be, but is not limited to, a mobile phone, a tablet computer, a wearable device, a vehicle-mounted terminal, a Road Side Unit (RSU), a smart home terminal, industrial sensing equipment and/or medical equipment, etc. The terminal can be deployed on land, in the ocean (for example, ships on the sea) and in the air (for example, airplanes, balloons and satellites).

The serving base station and the base station involved in the present disclosure are interface devices for the terminal to access the network. The base station can be various types of base stations, for example, the base station of the third-generation mobile communication (3G) network, the base station of the fourth-generation mobile communication (4G) network, the base station of the fifth-generation mobile communication (5G) network or other evolved base stations.

In an embodiment, the positioning measurement may be that the terminal measures a Positioning Reference Signal (PRS) sent by different base stations, and obtains Time of Arrival (TOA) or Time Difference of Arrival (TDOA) of the positioning reference signal (PRS) sent by different base stations, and calculates the coordinate position of the terminal by combining the position coordinates of each base station. It shall be noted that, the terminal needs to measure the PRS within a time period indicated by the measurement gap.

Figure 5:
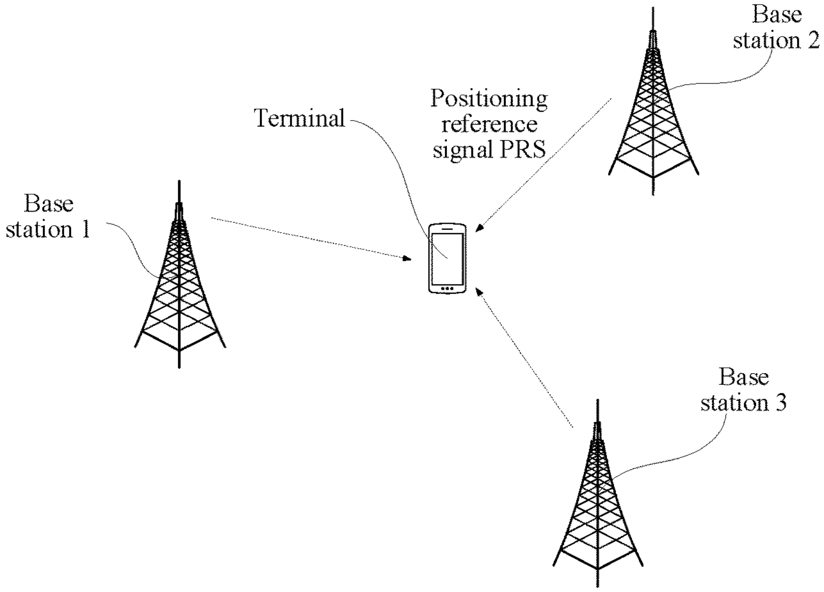
FIG. 5 is a schematic flowchart of a positioning measurement method according to an exemplary embodiment.

In an embodiment, as shown in FIG. 5, a schematic diagram showing the terminal performing positioning measurement is presented. According to differences between sending times, received by the terminal, of positioning reference signals sent by three or more base stations (for example, three base stations, namely, base station 1, base station 2 and base station 3) and times when the terminal receives positioning reference signals sent by the base stations, the terminal respectively calculates relative difference of transmission delays of the positioning reference signals between each base station and the terminal. Then the terminal calculates a position of the terminal according to relative differences between the transmission delays and position coordinates of the base stations. The positioning reference signal sent by each base station to the terminal may be a downlink positioning reference signal (PRS).

In an embodiment, the measurement assistance information may be configuration information that configures the terminal to perform the positioning measurement. The positioning server can send a new radio positioning protocol A (NRPPa) message for positioning to a serving base station of the terminal. The NRPPa message is a message for wireless communication based on NRPPa. The NRPPa message can carry the measurement assistance information. The measurement assistance information includes information indicating a pre-determined manner and information of a measurement gap. After receiving the measurement assistance information, the serving base station can determine, based on the measurement assistance information, the measurement gap of positioning measurement performed by the terminal by using the pre-determined manner indicated by the information of the pre-determined manner. The positioning manner may be a positioning manner based on RSTD. The measurement gap may include a start time point and an end time point. For example, a start time point is 1st millisecond, and an end time point is 3rd millisecond. In another embodiment, the measurement gap may include a start time point and a time duration. For example, the start time point is 1st millisecond, and the time duration may be 5 ms, 5.5 ms, 6 ms, 6.5 ms or 7 ms. In an embodiment, the serving base station will send information of the measurement gap to the terminal. After determining the measurement gap, the terminal performs the positioning measurement within the measurement gap.

In another embodiment, the new radio positioning protocol (NRPPa) message sent by the positioning server to the serving base station of the terminal includes the measurement assistance information. After receiving the NRPPa message, the serving base station determines a radio resource control (RRC) message according to the NRPPa message, and sends the RRC message to the terminal. The RRC message includes the measurement gap. The measurement gap in the RRC message is determined according to the measurement assistance information in the NRPPa message.

In an embodiment, when sending the measurement assistance information to the serving base station of the terminal, the positioning server also sends the measurement assistance information to the terminal. The measurement assistance information can be sent to the terminal by using the LPP message.

In an embodiment, the measurement assistance information includes at least one of measurement reference cell configuration information or adjacent cell configuration information. The reference cell and/or the adjacent cell may be cells used for positioning. The measurement assistance information can also indicate accuracy information of the base station sending PRS, height information of a transmitting point of the base station sending PRS, and coordinate information of a location of the base station, etc. The terminal can more accurately determine a signal strength and/or receiving time information of the received positioning reference signal with reference to the positioning assistance information, so as to obtain more accurate positioning results. In an embodiment, the measurement assistance information may also indicate configuration information of a variety of positioning manners for the positioning measurement by the terminal. After receiving the positioning assistance information, the terminal selects a positioning manner from the variety of positioning manners, and performs positioning according to configuration information corresponding to the selected positioning manner indicated by the positioning assistance information. In an embodiment, the measurement assistance information may further indicate time and frequency positions of the positioning reference signal sent by the base station. In such way, the terminal can receive the positioning reference signal at corresponding time and frequency positions according to indication of the positioning assistance information.

In an embodiment, the measurement assistance information is sent to the serving base station of the terminal when the positioning server receives a request to perform positioning measurement on the terminal. For example, when receiving the request to perform positioning tracking to the terminal, the positioning server sends the measurement assistance information to the serving base station of the terminal according to the request for positioning tracking.

In an embodiment, the measurement assistance information is sent to the serving base station of the terminal when the positioning server receives a request of the terminal to perform positioning measurement to the terminal through an access network. For example, the terminal needs to acquire coordinate information of a location of the terminal, and sends a request for positioning measurement to the positioning server through the access network, and after acquiring the request for positioning measurement, a core network element sends the measurement assistance information to the serving base station of the terminal.

In an embodiment, before sending the measurement assistance information to the serving base station of the terminal, the positioning server also sends request capability information of the positioning measurement to the terminal, where the request capability information is used to request that the terminal supports or does not support capability of performing the positioning measurement by using the pre-determined manner. The positioning server receives feedback information sent by the terminal in response to the request capability information, where the feedback information is used to indicate that the terminal supports or does not support performing the positioning measurement by using the pre-determined manner. When the feedback information indicates that the terminal supports performing the positioning measurement by using the pre-determined manner, the positioning server sends the measurement assistance information to the serving base station of the terminal. When the feedback information indicates that the terminal does not support performing the positioning measurement by using the pre-determined manner, the positioning server will not send the measurement assistance information to the serving base station of the terminal. It shall be noted that, when the feedback information indicates that the terminal does not supports performing the positioning measurement by using the pre-determined manner, the positioning server also will not send the measurement assistance information to the terminal.

In an embodiment, the feedback information sent by the terminal to the positioning server includes a cell identifier indicating the serving base station. In such way, the positioning server can send the measurement assistance information to the base station indicated by the cell identifier.

In an embodiment, the feedback information may further include at least one of:

information of the supported pre-determined manner;

frequency band information of a supported frequency band; or information of supporting or not supporting the pre-determined manner.

In an embodiment, after sending the measurement assistance information to the serving base station of the terminal, the positioning server will also send a request location information message of the positioning measurement to the terminal, where the request location information message is used to trigger the terminal to perform the positioning measurement by using the pre-determined manner. After receiving the request location information message, the terminal will perform the positioning measurement.

In the embodiments of the present disclosure, measurement assistance information is sent to a serving base station of a terminal, where the measurement assistance information is used by the serving base station to determine a measurement gap of positioning measurement performed by the terminal by using a pre-determined manner. The positioning server can directly send the measurement assistance information to the serving base station of the terminal. After receiving the measurement assistance information, the serving base station of the terminal can determine the measurement gap of the positioning measurement performed by the terminal by using the pre-determined manner, compared to a way that the positioning server needs to send the measurement assistance information to the terminal and then the terminal sends the measurement assistance information to the base station, transmission delay of the measurement assistance information is reduced. In such way, a time delay of the terminal positioning method can be reduced, thereby improving user experience.

It should be noted that those skilled in the art can understand that the methods provided by the embodiments of the present disclosure can be executed alone or together with some methods in the embodiments of the present disclosure or some methods in related technologies.

Figure 6:
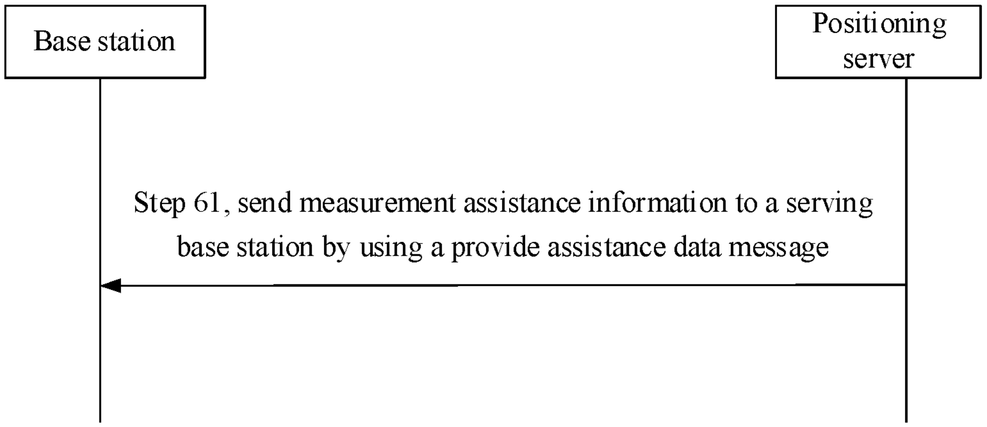
FIG. 6 is a schematic flowchart of a positioning measurement method according to an exemplary embodiment.

As shown in FIG. 6, the present embodiment provides a positioning measurement method, performed by a positioning server, including:

Step 61, sending measurement assistance information to a serving base station by using a provide assistance data message.

In an embodiment, the measurement assistance information is sent to the serving base station by using a NRPPa provide assistance data message.

In another embodiment, the NRPPa message sent by the positioning server to the serving base station of the terminal includes the measurement assistance information. After receiving the NRPPa message, the serving base station determines a RRC message according to the NRPPa message, and sends the RRC message to the terminal. The RRC message includes the measurement gap. The measurement gap in the RRC message is determined according to the measurement assistance information in the NRPPa message.

In an embodiment, the measurement assistance information is sent to the serving base station by using the NRPPa provide assistance data message when the positioning server receives a request to perform positioning measurement on the terminal. In an embodiment, the measurement assistance information is sent to the serving base station by using the NRPPa provide assistance data message when the positioning server receives a request of the terminal to perform positioning measurement to the terminal through an access network.

It should be noted that those skilled in the art can understand that the methods provided by the embodiments of the present disclosure can be executed alone or together with some methods in the embodiments of the present disclosure or some methods in related technologies.

Figure 7:
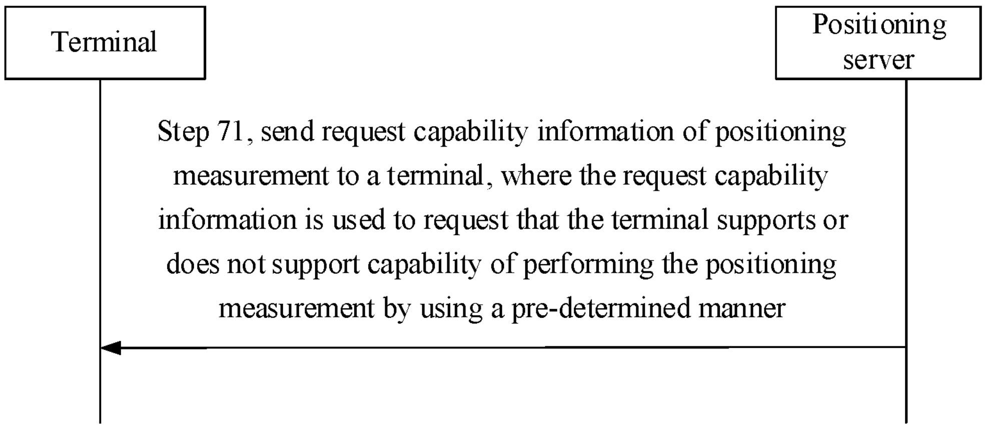
FIG. 7 is a schematic flowchart of a positioning measurement method according to an exemplary embodiment.

As shown in FIG. 7, the present embodiment provides a positioning measurement method, performed by a positioning server, including:

Step 71, sending request capability information of positioning measurement to a terminal, where the request capability information is used to request that the terminal supports or does not support capability of performing the positioning measurement by using a pre-determined manner.

In an embodiment, the request capability information of the positioning measurement is sent to the terminal when the positioning server receives a request to perform positioning measurement on the terminal. In another embodiment, the request capability information of the positioning measurement is sent to the terminal when the positioning server receives a request of the terminal to perform positioning measurement to the terminal through an access network.

In an embodiment, after sending the request capability information of the positioning measurement to the terminal, the positioning server receives feedback information sent by the terminal in response to the request capability information, where the feedback information is used to indicate that the terminal supports or does not support performing the positioning measurement by using the pre-determined manner. When the feedback information indicates that the terminal supports performing the positioning measurement by using the pre-determined manner, the positioning server sends the measurement assistance information to the serving base station of the terminal. When the feedback information indicates that the terminal does not support performing the positioning measurement by using the pre-determined manner, the positioning server will not send the measurement assistance information to the serving base station of the terminal.

It should be noted that those skilled in the art can understand that the methods provided by the embodiments of the present disclosure can be executed alone or together with some methods in the embodiments of the present disclosure or some methods in related technologies.

Figure 8:
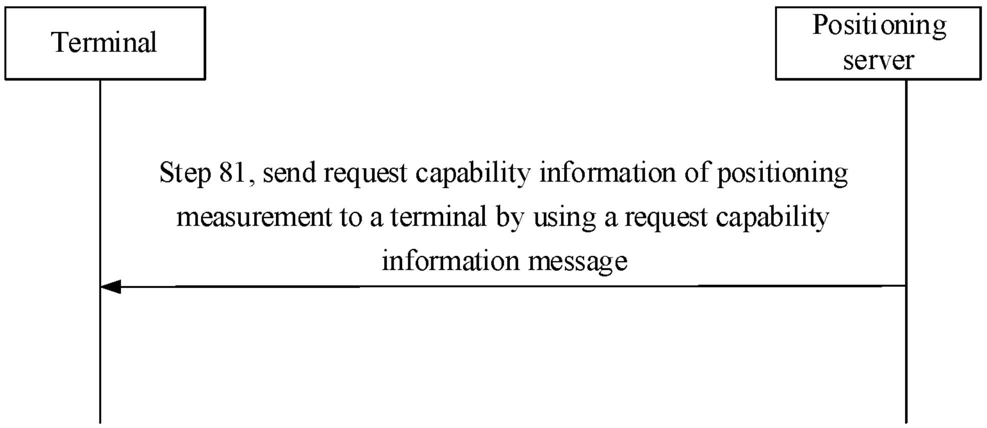
FIG. 8 is a schematic flowchart of a positioning measurement method according to an exemplary embodiment.

As shown in FIG. 8, the present embodiment provides a positioning measurement method, performed by a positioning server, including:

Step 81, sending request capability information of positioning measurement to a terminal by using a request capability information message.

In an embodiment, the request capability information of the positioning measurement is sent to the terminal by using a LPP request capability information message.

In an embodiment, after sending the LPP message carrying the request capability information of the positioning measurement to the terminal, the positioning server receives feedback information sent by the terminal through a LPP message, where the feedback information is used to indicate that the terminal supports or does not support performing the positioning measurement by using the pre-determined manner. When the feedback information indicates that the terminal supports performing the positioning measurement by using the pre-determined manner, the positioning server sends the measurement assistance information to the serving base station of the terminal. Alternatively, when the feedback information indicates that the terminal does not support performing the positioning measurement by using the pre-determined manner, the positioning server will not send the measurement assistance information to the serving base station of the terminal.

In an embodiment, when the terminal supports performing the positioning measurement by using the pre-determined manner, the feedback information indicates that the terminal supports performing the positioning measurement by using the pre-determined manner. Alternatively, when the terminal does not support performing the positioning measurement by using the pre-determined manner, the feedback information indicates that the terminal does not support performing the positioning measurement by using the pre-determined manner.

It should be noted that those skilled in the art can understand that the methods provided by the embodiments of the present disclosure can be executed alone or together with some methods in the embodiments of the present disclosure or some methods in related technologies.

Figure 9:
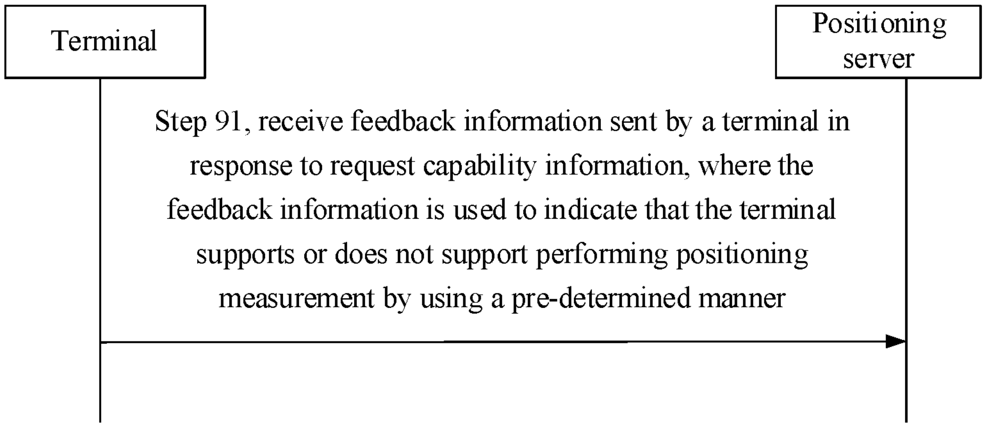
FIG. 9 is a schematic flowchart of a positioning measurement method according to an exemplary embodiment.

As shown in FIG. 9, the present embodiment provides a positioning measurement method, performed by a positioning server, including:

Step 91, receiving feedback information sent by a terminal in response to request capability information, where the feedback information is used to indicate that the terminal supports or does not support performing positioning measurement by using a pre-determined manner.

In an embodiment, when the terminal supports performing the positioning measurement by using the pre-determined manner, the feedback information indicates that the terminal supports performing the positioning measurement by using the pre-determined manner. Alternatively, when the terminal does not support performing the positioning measurement by using the pre-determined manner, the feedback information indicates that the terminal does not support performing the positioning measurement by using the pre-determined manner.

In an embodiment, when the feedback information indicates that the terminal supports performing the positioning measurement by using the pre-determined manner, the positioning server sends the measurement assistance information to the serving base station of the terminal. Alternatively, when the feedback information indicates that the terminal does not support performing the positioning measurement by using the pre-determined manner, the positioning server will not send the measurement assistance information to the serving base station of the terminal.

It should be noted that those skilled in the art can understand that the methods provided by the embodiments of the present disclosure can be executed alone or together with some methods in the embodiments of the present disclosure or some methods in related technologies.

Figure 10:
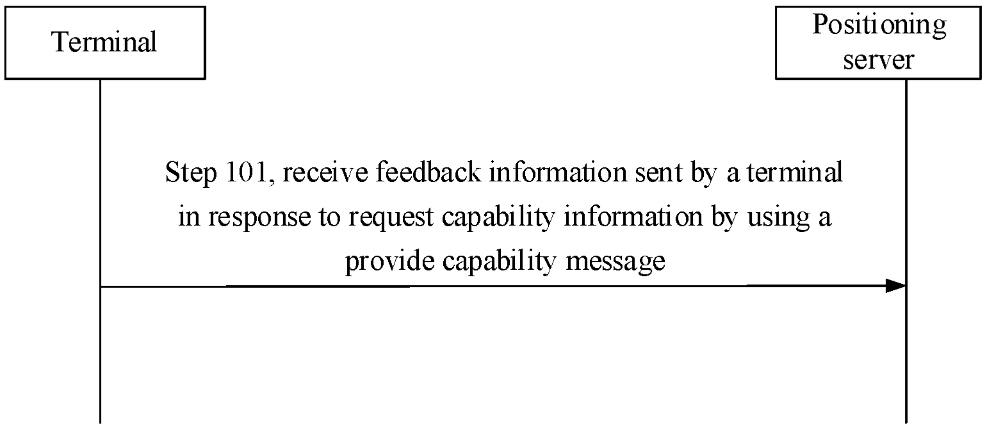
FIG. 10 is a schematic flowchart of a positioning measurement method according to an exemplary embodiment.

As shown in FIG. 10, the present embodiment provides a positioning measurement method, performed by a positioning server, including:

Step 101, receiving feedback information sent by a terminal in response to request capability information by using a provide capability message.

In an embodiment, feedback information sent by a terminal in response to request capability information is received by using a LPP provide capability message.

In an embodiment, after sending the LPP message carrying the request capability information of the positioning measurement to the terminal, the positioning server receives feedback information sent by the terminal through a LPP message, where the feedback information is used to indicate that the terminal supports or does not support performing the positioning measurement by using the pre-determined manner. When the feedback information indicates that the terminal supports performing the positioning measurement by using the pre-determined manner, the positioning server sends the measurement assistance information to the serving base station of the terminal. Alternatively, when the feedback information indicates that the terminal does not support performing the positioning measurement by using the pre-determined manner, the positioning server will not send the measurement assistance information to the serving base station of the terminal.

It should be noted that those skilled in the art can understand that the methods provided by the embodiments of the present disclosure can be executed alone or together with some methods in the embodiments of the present disclosure or some methods in related technologies.

In an embodiment, the feedback information includes a cell identifier indicating the serving base station.

In an embodiment, the feedback information further includes at least one of:

- information of the supported pre-determined manner;
- frequency band information of a supported frequency band; or
- information of supporting or not supporting the pre-determined manner.

In an embodiment, the measurement assistance information includes at least one of measurement reference cell configuration information or adjacent cell configuration information.

Figure 11:
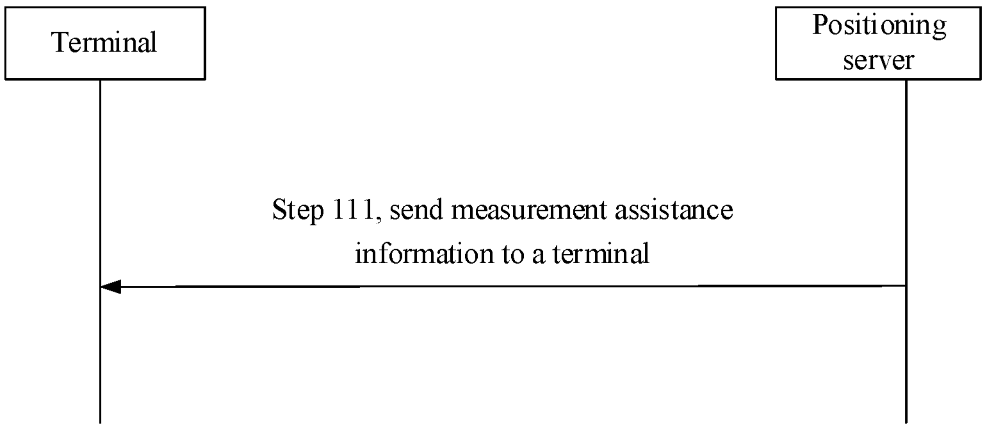
FIG. 11 is a schematic flowchart of a positioning measurement method according to an exemplary embodiment.

As shown in FIG. 11, the present embodiment provides a positioning measurement method, performed by a positioning server, including:

Step 111, sending measurement assistance information to a terminal.

In an embodiment, when sending the measurement assistance information to the serving base station of the terminal, the positioning server also sends the measurement assistance information to the terminal. The measurement assistance information can be sent to the terminal by using the LPP message.

In an embodiment, the measurement assistance information includes at least one of measurement reference cell configuration information or adjacent cell configuration information. The reference cell and/or the adjacent cell may be cells used for positioning. The measurement assistance information can also indicate accuracy information of the base station sending PRS, height information of a transmitting point of the base station sending PRS, and coordinate information of a location of the base station, etc. The terminal can more accurately determine a signal strength and/or receiving time information of the received positioning reference signal with reference to the positioning assistance information, so as to obtain more accurate positioning results. In an embodiment, the measurement assistance information may also indicate configuration information of a variety of positioning manners for the positioning measurement by the terminal. After receiving the positioning assistance information, the terminal selects a positioning manner from the variety of positioning manners, and performs positioning according to configuration information corresponding to the selected positioning manner indicated by the positioning assistance information. In an embodiment, the measurement assistance information may further indicate time and frequency positions of the positioning reference signal sent by the base station. In such way, the terminal can receive the positioning reference signal at corresponding time and frequency positions according to indication of the positioning assistance information.

It should be noted that those skilled in the art can understand that the methods provided by the embodiments of the present disclosure can be executed alone or together with some methods in the embodiments of the present disclosure or some methods in related technologies.

Figure 12:
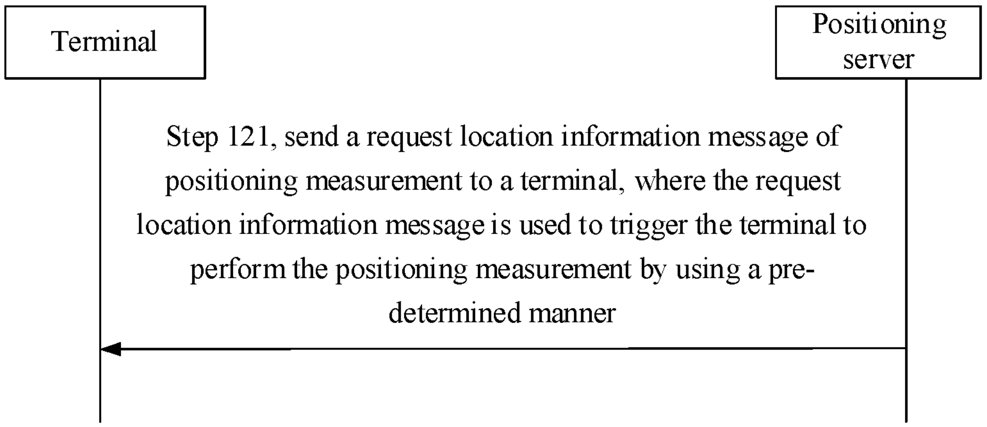
FIG. 12 is a schematic flowchart of a positioning measurement method according to an exemplary embodiment.

As shown in FIG. 12, the present embodiment provides a positioning measurement method, performed by a positioning server, including:

Step 121, sending a request location information message of positioning measurement to a terminal, where the request location information message is used to trigger the terminal to perform the positioning measurement by using a predetermined manner.

In an embodiment, after sending the measurement assistance information to the serving base station of the terminal, the positioning server will also send a request location information message of the positioning measurement to the terminal, where the request location information message is used to trigger the terminal to perform the positioning measurement by using the pre-determined manner. After receiving the request location information message, the terminal will perform the positioning measurement.

It should be noted that those skilled in the art can understand that the methods provided by the embodiments of the present disclosure can be executed alone or together with some methods in the embodiments of the present disclosure or some methods in related technologies.

Figure 13:
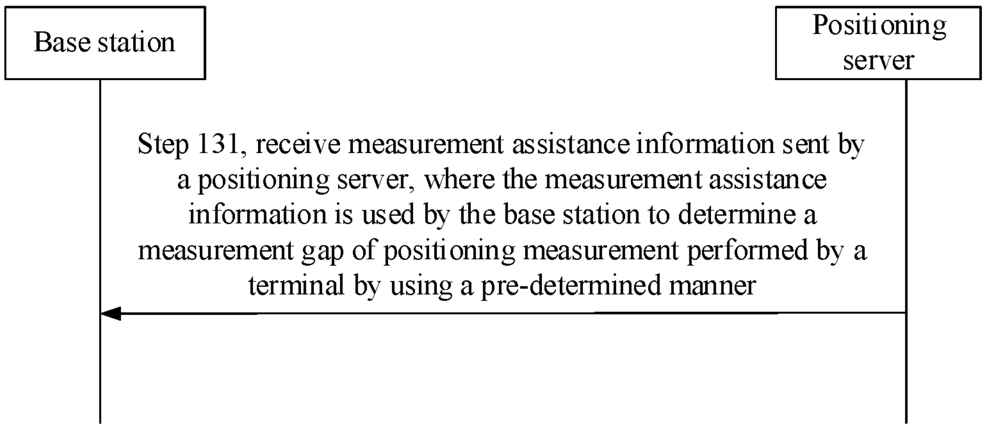
FIG. 13 is a schematic flowchart of a positioning measurement method according to an exemplary embodiment.

As shown in FIG. 13, the present embodiment provides a positioning measurement method, performed by a base station, including:

Step 131, receiving measurement assistance information sent by a positioning server, where the measurement assistance information is used by the base station to determine a measurement gap of positioning measurement performed by a terminal by using a pre-determined manner.

The positioning server may be a core network device. The positioning server may be a positioning management function (location management function, LMF) in a core network. It shall be noted that the positioning server may also be other function entities in the core network.

The terminal may be a device with wireless receiving and sending function. The terminal may be, but is not limited to, a mobile phone, a tablet computer, a wearable device, a vehicle-mounted terminal, a Road Side Unit (RSU), a smart home terminal, industrial sensing equipment and/or medical equipment, etc. The terminal can be deployed on land, in the ocean (for example, ships on the sea) and in the air (for example, airplanes, balloons and satellites).

The serving base station and the base station involved in the present disclosure are interface devices for the terminal to access the network. The base station can be various types of base stations, for example, the base station of the third-generation mobile communication (3G) network, the base station of the fourth-generation mobile communication (4G) network, the base station of the fifth-generation mobile communication (5G) network or other evolved base stations.

In an embodiment, the positioning measurement may be that the terminal measures a Positioning Reference Signal (PRS) sent by different base stations, and obtains Time of Arrival (TOA) or Time Difference of Arrival (TDOA) of the positioning reference signal (PRS) sent by different base stations, and calculates the coordinate position of the terminal by combining the position coordinates of each base station. It shall be noted that, the terminal needs to measure the PRS within a time period indicated by the measurement gap.

In an embodiment, as shown in FIG. 5, a schematic diagram showing the terminal performing positioning measurement is presented. According to differences between sending times, received by the terminal, of positioning reference signals sent by three or more base stations (for example, three base stations, namely, base station 1, base station 2 and base station 3) and times when the terminal receives positioning reference signals sent by the base stations, the terminal respectively calculates relative difference of transmission delays of the positioning reference signals between each base station and the terminal. Then the terminal calculates a position of the terminal according to relative differences between the transmission delays and position coordinates of the base stations. The positioning reference signal sent by each base station to the terminal may be a downlink positioning reference signal (PRS).

In an embodiment, the measurement assistance information may be configuration information that configures the terminal to perform the positioning measurement. The positioning server can send a NRPPa message for positioning to a serving base station of the terminal. The NRPPa message is a message for wireless communication based on NRPPa. The NRPPa message can carry the measurement assistance information. The measurement assistance information includes information indicating a pre-determined manner and information of a measurement gap. After receiving the measurement assistance information, the serving base station can determine, based on the measurement assistance information, the measurement gap of positioning measurement performed by the terminal by using the pre-determined manner indicated by the information of the pre-determined manner. The positioning manner may be a positioning manner based on RSTD. The measurement gap may include a start time point and an end time point. For example, a start time point is 1st millisecond, and an end time point is 3rd millisecond. In another embodiment, the measurement gap may include a start time point and a time duration. For example, the start time point is 1st millisecond, and the time duration may be 5 ms, 5.5 ms, 6 ms, 6.5 ms or 7 ms. In an embodiment, the serving base station will send information of the measurement gap to the terminal. After determining the measurement gap, the terminal performs the positioning measurement within the measurement gap.

In another embodiment, the NRPPa message sent by the positioning server to the serving base station of the terminal includes the measurement assistance information. After receiving the NRPPa message, the serving base station determines a RRC message according to the NRPPa message, and sends the RRC message to the terminal. The RRC message includes the measurement gap. The measurement gap in the RRC message is determined according to the measurement assistance information in the NRPPa message.

In an embodiment, when sending the measurement assistance information to the serving base station of the terminal, the positioning server also sends the measurement assistance information to the terminal. The measurement assistance information can be sent to the terminal by using the LPP message.

In an embodiment, the measurement assistance information includes at least one of measurement reference cell configuration information or adjacent cell configuration information. The reference cell and/or the adjacent cell may be cells used for positioning. The measurement assistance information can also indicate accuracy information of the base station sending PRS, height information of a transmitting point of the base station sending PRS, and coordinate information of a location of the base station, etc. The terminal can more accurately determine a signal strength and/or receiving time information of the received positioning reference signal with reference to the positioning assistance information, so as to obtain more accurate positioning results. In an embodiment, the measurement assistance information may also indicate configuration information of a variety of positioning manners for the positioning measurement by the terminal. After receiving the positioning assistance information, the terminal selects a positioning manner from the variety of positioning manners, and performs positioning according to configuration information corresponding to the selected positioning manner indicated by the positioning assistance information. In an embodiment, the measurement assistance information may further indicate time and frequency positions of the positioning reference signal sent by the base station. In such way, the terminal can receive the positioning reference signal at corresponding time and frequency positions according to indication of the positioning assistance information.

In an embodiment, the measurement assistance information is sent to the serving base station of the terminal when the positioning server receives a request to perform positioning measurement on the terminal. For example, when receiving the request to perform positioning tracking to the terminal, the positioning server sends the measurement assistance information to the serving base station of the terminal according to the request for positioning tracking.

In an embodiment, the measurement assistance information is sent to the serving base station of the terminal when the positioning server receives a request of the terminal to perform positioning measurement to the terminal through an access network. For example, the terminal needs to acquire coordinate information of a location of the terminal, and sends a request for positioning measurement to the positioning server through the access network, and after acquiring the request for positioning measurement, a core network element sends the measurement assistance information to the serving base station of the terminal.

In an embodiment, before sending the measurement assistance information to the serving base station of the terminal, the positioning server also sends request capability information of the positioning measurement to the terminal, where the request capability information is used to request that the terminal supports or does not support capability of performing the positioning measurement by using the pre-determined manner. The positioning server receives feedback information sent by the terminal in response to the request capability information, where the feedback information is used to indicate that the terminal supports or does not support performing the positioning measurement by using the pre-determined manner. When the feedback information indicates that the terminal supports performing the positioning measurement by using the pre-determined manner, the positioning server sends the measurement assistance information to the serving base station of the terminal. When the feedback information indicates that the terminal does not support performing the positioning measurement by using the pre-determined manner, the positioning server will not send the measurement assistance information to the serving base station of the terminal. It shall be noted that, when the feedback information indicates that the terminal does not supports performing the positioning measurement by using the pre-determined manner, the positioning server also will not send the measurement assistance information to the terminal.

In an embodiment, the feedback information sent by the terminal to the positioning server includes a cell identifier indicating the serving base station. In such way, the positioning server can send the measurement assistance information to the base station indicated by the cell identifier.

In an embodiment, the feedback information may further include at least one of:

information of the supported pre-determined manner;

frequency band information of a supported frequency band; or information of supporting or not supporting the pre-determined manner.

In an embodiment, after sending the measurement assistance information to the serving base station of the terminal, the positioning server will also send a request location information message of the positioning measurement to the terminal, where the request location information message is used to trigger the terminal to perform the positioning measurement by using the pre-determined manner. After receiving the request location information message, the terminal will perform the positioning measurement.

Figure 14:
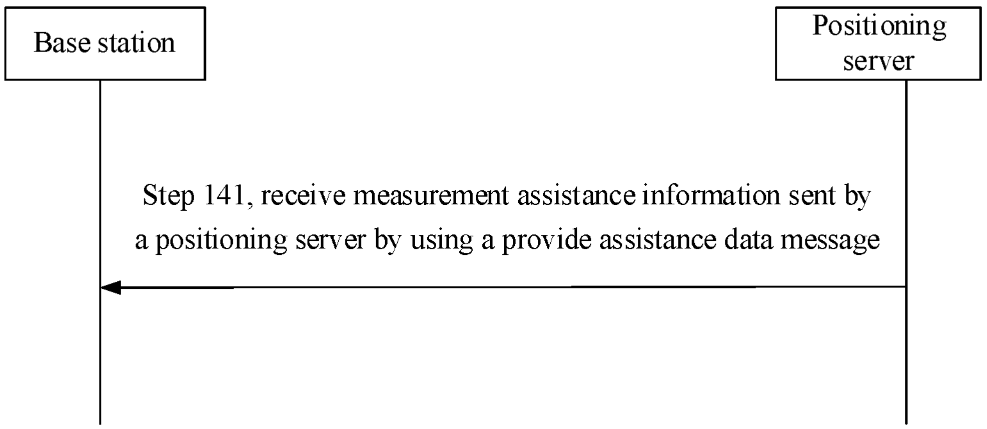
FIG. 14 is a schematic flowchart of a positioning measurement method according to an exemplary embodiment.

As shown in FIG. 14, the present embodiment provides a positioning measurement method, performed by a base station, including:

Step 141, receiving measurement assistance information sent by a positioning server by using a provide assistance data message.

In an embodiment, the measurement assistance information sent by the positioning server by using a NRPPa provide assistance data message is received.

In another embodiment, the NRPPa message sent by the positioning server to the serving base station of the terminal includes the measurement assistance information. After receiving the NRPPa message, the serving base station determines a RRC message according to the NRPPa message, and sends the RRC message to the terminal. The RRC message includes the measurement gap. The measurement gap in the RRC message is determined according to the measurement assistance information in the NRPPa message.

In an embodiment, the measurement assistance information is sent to the serving base station by using the NRPPa provide assistance data message when the positioning server receives a request to perform positioning measurement on the terminal. In an embodiment, the measurement assistance information is sent to the serving base station by using the NRPPa provide assistance data message when the positioning server receives a request of the terminal to perform positioning measurement to the terminal through an access network.

It should be noted that those skilled in the art can understand that the methods provided by the embodiments of the present disclosure can be executed alone or together with some methods in the embodiments of the present disclosure or some methods in related technologies.

Figure 15:
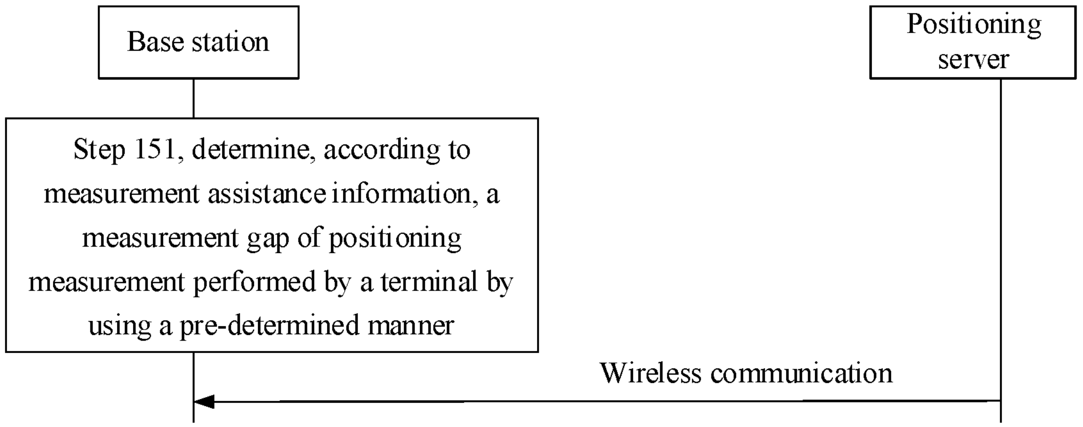
FIG. 15 is a schematic flowchart of a positioning measurement method according to an exemplary embodiment.

As shown in FIG. 15, the present embodiment provides a positioning measurement method, performed by a base station, including:

Step 151, determining, according to measurement assistance information, a measurement gap of positioning measurement performed by a terminal by using a pre-determined manner.

In an embodiment, the measurement assistance information may be configuration information that configures the terminal to perform the positioning measurement. The positioning server can send a NRPPa message for positioning to a serving base station of the terminal. The NRPPa message is a message for wireless communication based on NRPPa. The NRPPa message can carry the measurement assistance information. The measurement assistance information includes information indicating a pre-determined manner and information of a measurement gap. After receiving the measurement assistance information, the serving base station can determine, based on the measurement assistance information, the measurement gap of positioning measurement performed by the terminal by using the pre-determined manner indicated by the information of the pre-determined manner. The positioning manner may be a positioning manner based on RSTD. The measurement gap may include a start time point and an end time point. For example, a start time point is 1st millisecond, and an end time point is 3rd millisecond. In another embodiment, the measurement gap may include a start time point and a time duration. For example, the start time point is 1st millisecond, and the time duration may be 5 ms, 5.5 ms, 6 ms, 6.5 ms or 7 ms. In an embodiment, the serving base station will send the measurement gap to the terminal. After receiving the measurement gap, the terminal performs the positioning measurement within the measurement gap.

It should be noted that those skilled in the art can understand that the methods provided by the embodiments of the present disclosure can be executed alone or together with some methods in the embodiments of the present disclosure or some methods in related technologies.

Figure 16:
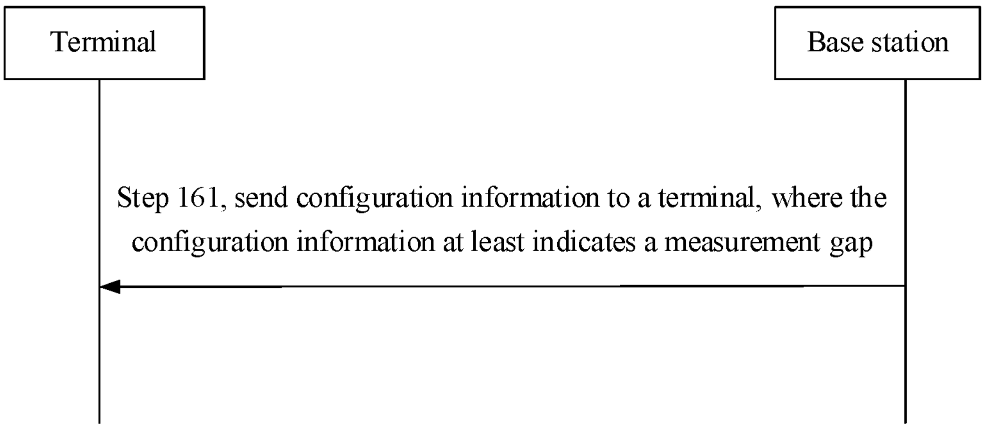
FIG. 16 is a schematic flowchart of a positioning measurement method according to an exemplary embodiment.

As shown in FIG. 16, the present embodiment provides a positioning measurement method, performed by a base station, including:

Step 161, sending configuration information to a terminal, where the configuration information at least indicates a measurement gap.

In another embodiment, the NRPPa message sent by the positioning server to the serving base station of the terminal includes the measurement assistance information. After receiving the NRPPa message, the serving base station determines a RRC message according to the NRPPa message, and sends the RRC message to the terminal. The RRC message includes the configuration information. Information of the measurement gap in configuration information in the RRC message is determined according to the measurement assistance information in the NRPPa message.

It should be noted that those skilled in the art can understand that the methods provided by the embodiments of the present disclosure can be executed alone or together with some methods in the embodiments of the present disclosure or some methods in related technologies.

Figure 17:
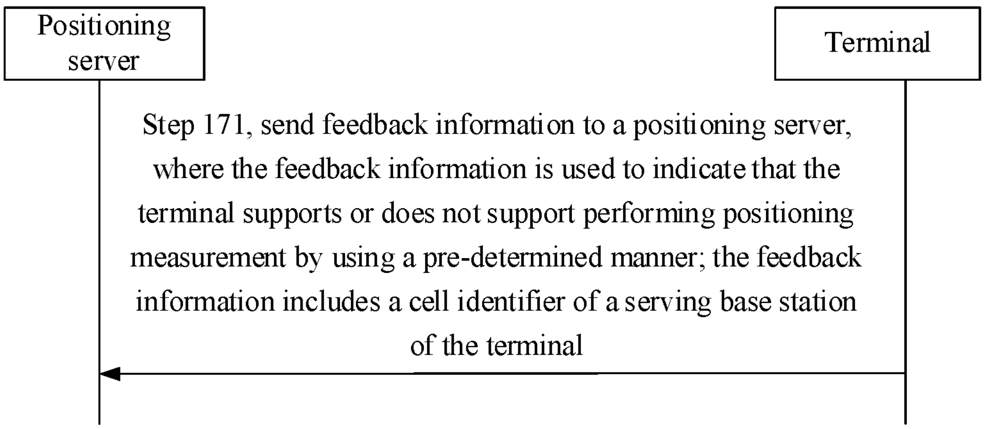
FIG. 17 is a schematic flowchart of a positioning measurement method according to an exemplary embodiment.

As shown in FIG. 17, the present embodiment provides a positioning measurement method, performed by a terminal, including:

Step 171, sending feedback information to a positioning server, where the feedback information is used to indicate that the terminal supports or does not support performing positioning measurement by using a pre-determined manner; the feedback information includes a cell identifier of a serving base station of the terminal.

In an embodiment, the feedback information sent by the terminal to the positioning server includes a cell identifier indicating the serving base station. In such way, the positioning server can send the measurement assistance information to the base station indicated by the cell identifier.

In an embodiment, before sending the measurement assistance information to the serving base station of the terminal, the positioning server also sends request capability information of the positioning measurement to the terminal, where the request capability information is used to request that the terminal supports or does not support capability of performing the positioning measurement by using the pre-determined manner. The positioning server receives feedback information sent by the terminal in response to the request capability information, where the feedback information is used to indicate that the terminal supports or does not support performing the positioning measurement by using the pre-determined manner. When the feedback information indicates that the terminal supports performing the positioning measurement by using the pre-determined manner, the positioning server sends the measurement assistance information to the serving base station of the terminal. When the feedback information indicates that the terminal does not support performing the positioning measurement by using the pre-determined manner, the positioning server will not send the measurement assistance information to the serving base station of the terminal. It shall be noted that, when the feedback information indicates that the terminal does not supports performing the positioning measurement by using the pre-determined manner, the positioning server also will not send the measurement assistance information to the terminal.

Specifically, description in step 41 can be referred to, which will not be repeated here.

It should be noted that those skilled in the art can understand that the methods provided by the embodiments of the present disclosure can be executed alone or together with some methods in the embodiments of the present disclosure or some methods in related technologies.

Figure 18:
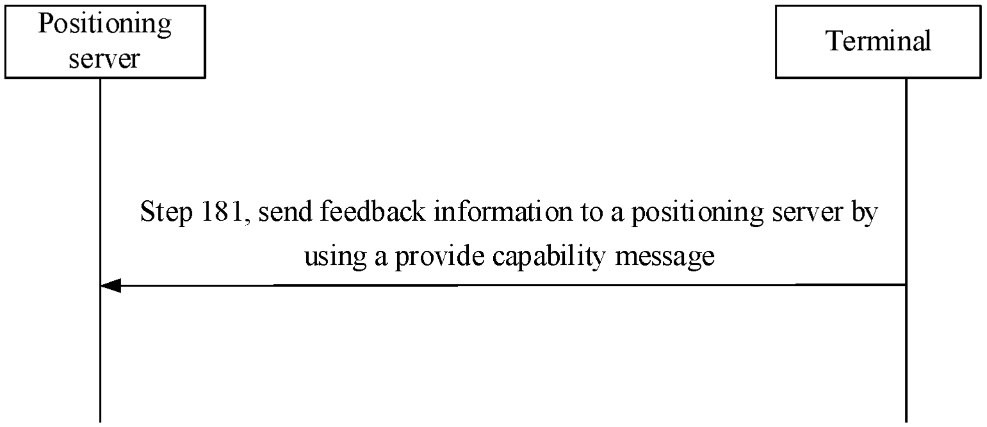
FIG. 18 is a schematic flowchart of a positioning measurement method according to an exemplary embodiment.

As shown in FIG. 18, the present embodiment provides a positioning measurement method, performed by a terminal, including:

Step 181, sending feedback information to a positioning server by using a provide capability message.

Specifically, description in step 91 can be referred to, which will not be repeated here.

It should be noted that those skilled in the art can understand that the methods provided by the embodiments of the present disclosure can be executed alone or together with some methods in the embodiments of the present disclosure or some methods in related technologies.

In an embodiment, the feedback information further includes at least one of:

- information of the supported pre-determined manner;
- frequency band information of a supported frequency band; or
- information of supporting or not supporting the pre-determined manner.

Figure 19:
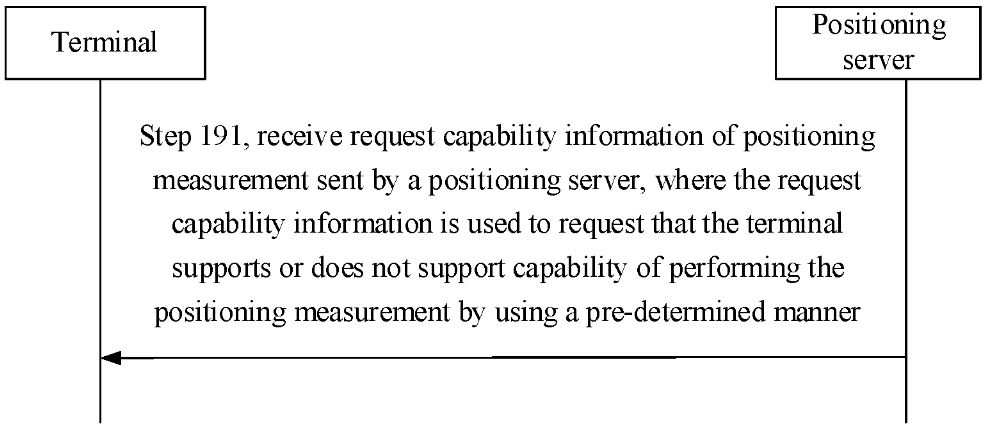
FIG. 19 is a schematic flowchart of a positioning measurement method according to an exemplary embodiment.

As shown in FIG. 19, the present embodiment provides a positioning measurement method, performed by a terminal, including:

Step 191, receiving request capability information of positioning measurement sent by a positioning server, where the request capability information is used to request that the terminal supports or does not support capability of performing the positioning measurement by using a pre-determined manner.

Specifically, description in step 71 can be referred to, which will not be repeated here.

It should be noted that those skilled in the art can understand that the methods provided by the embodiments of the present disclosure can be executed alone or together with some methods in the embodiments of the present disclosure or some methods in related technologies.

Figure 20:
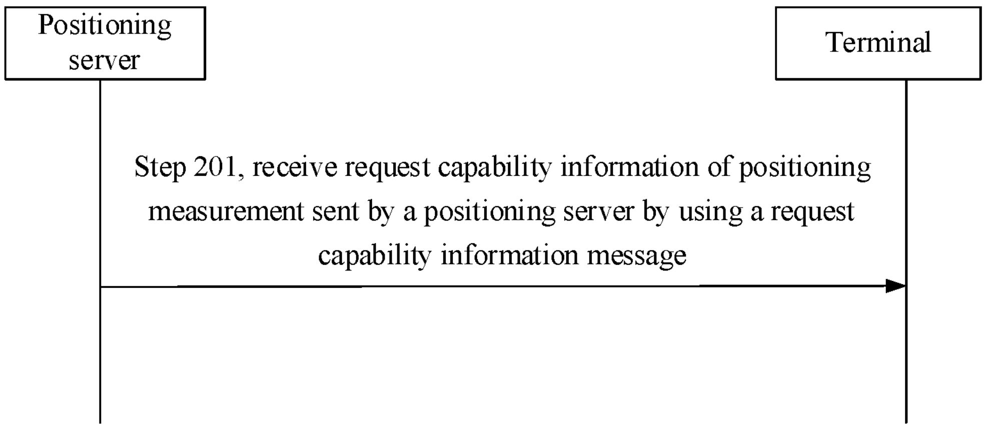
FIG. 20 is a schematic flowchart of a positioning measurement method according to an exemplary embodiment.

As shown in FIG. 20, the present embodiment provides a positioning measurement method, performed by a terminal, including:

Step 201, receiving request capability information of positioning measurement sent by a positioning server by using a request capability information message.

Specifically, description in step 81 can be referred to, which will not be repeated here.

It should be noted that those skilled in the art can understand that the methods provided by the embodiments of the present disclosure can be executed alone or together with some methods in the embodiments of the present disclosure or some methods in related technologies.

Figure 21:
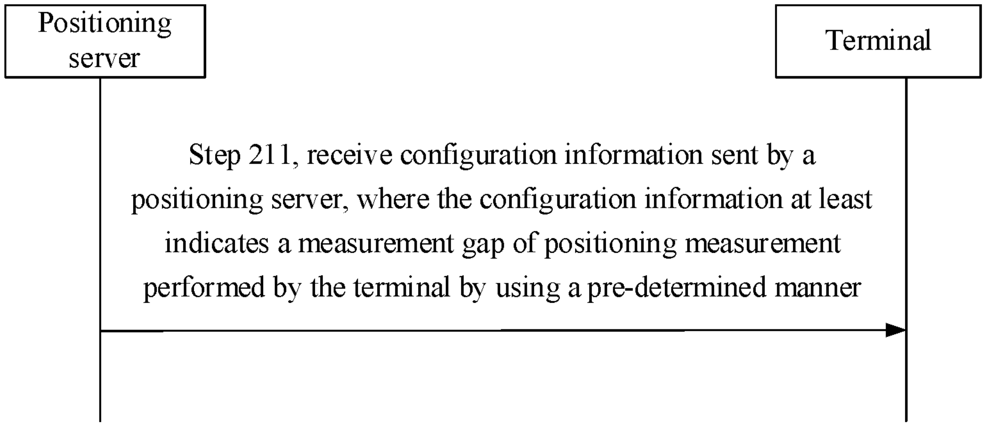
FIG. 21 is a schematic flowchart of a positioning measurement method according to an exemplary embodiment.

As shown in FIG. 21, the present embodiment provides a positioning measurement method, performed by a terminal, including:

Step 211, receiving configuration information sent by a positioning server, where the configuration information at least indicates a measurement gap of positioning measurement performed by the terminal by using a pre-determined manner.

Specifically, description in step 16 can be referred to, which will not be repeated here.

It should be noted that those skilled in the art can understand that the methods provided by the embodiments of the present disclosure can be executed alone or together with some methods in the embodiments of the present disclosure or some methods in related technologies.

Figure 22:
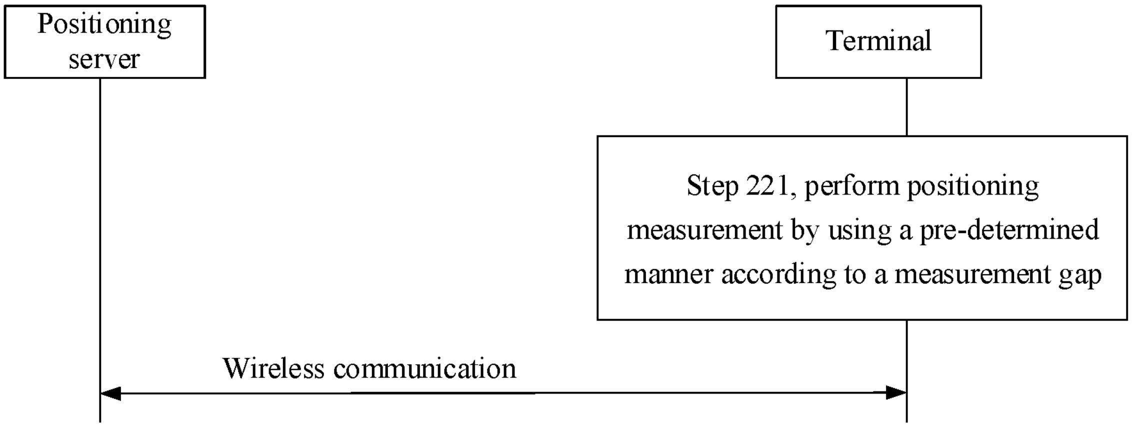
FIG. 22 is a schematic flowchart of a positioning measurement method according to an exemplary embodiment.

As shown in FIG. 22, the present embodiment provides a positioning measurement method, performed by a terminal, including:

Step 221, performing positioning measurement by using a pre-determined manner according to a measurement gap.

In an embodiment, the measurement gap may include a start time point and an end time point. For example, a start time point is 1st millisecond, and an end time point is 3rd millisecond. In another embodiment, the measurement gap may include a start time point and a time duration. For example, the start time point is 1st millisecond, and the time duration may be 5 ms, 5.5 ms, 6 ms, 6.5 ms or 7 ms. In an embodiment, the serving base station will send the measurement gap to the terminal. After receiving the measurement gap, the terminal performs the positioning measurement within the measurement gap.

In an embodiment, the positioning measurement can be performed by using the pre-determined manner within a time period indicated by the measurement gap.

It should be noted that those skilled in the art can understand that the methods provided by the embodiments of the present disclosure can be executed alone or together with some methods in the embodiments of the present disclosure or some methods in related technologies.

Figure 23:
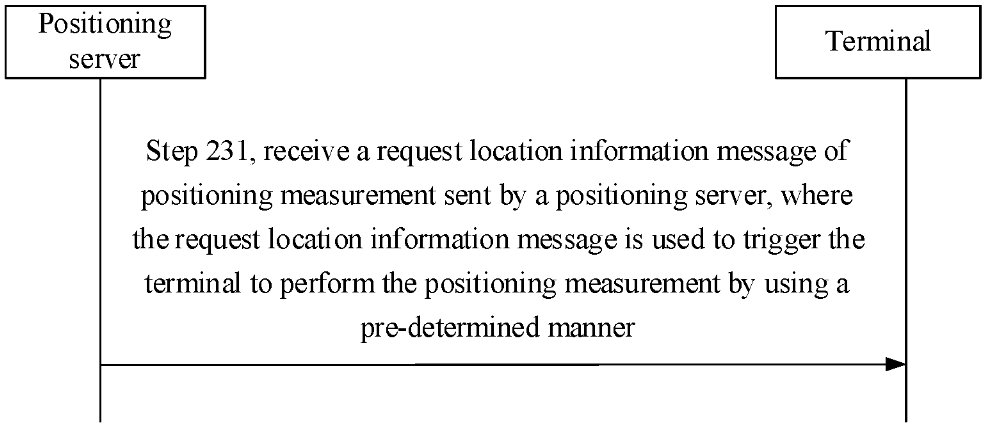
FIG. 23 is a schematic flowchart of a positioning measurement method according to an exemplary embodiment.

As shown in FIG. 23, the present embodiment provides a positioning measurement method, performed by a terminal, including:

Step 231, receiving a request location information message of positioning measurement sent by a positioning server, where the request location information message is used to trigger the terminal to perform the positioning measurement by using a pre-determined manner.

Specifically, description in step 12 can be referred to, which will not be repeated here.

It should be noted that those skilled in the art can understand that the methods provided by the embodiments of the present disclosure can be executed alone or together with some methods in the embodiments of the present disclosure or some methods in related technologies.

Figure 24:
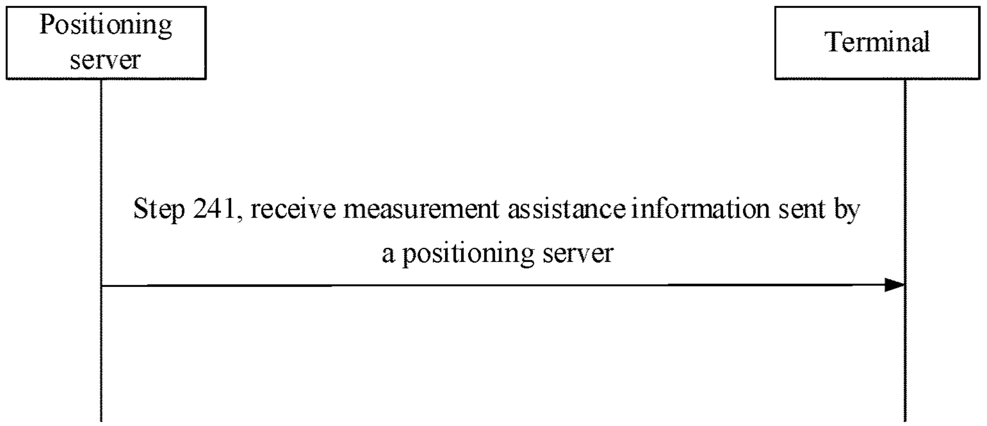
FIG. 24 is a schematic flowchart of a positioning measurement method according to an exemplary embodiment.

As shown in FIG. 24, the present embodiment provides a positioning measurement method, performed by a terminal, including:

Step 241, receiving measurement assistance information sent by a positioning server.

Specifically, description in step 11 can be referred to, which will not be repeated here.

It should be noted that those skilled in the art can understand that the methods provided by the embodiments of the present disclosure can be executed alone or together with some methods in the embodiments of the present disclosure or some methods in related technologies.

Figure 25:
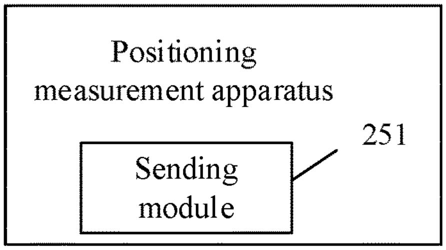
FIG. 25 is a schematic diagram of a positioning measurement apparatus according to an exemplary embodiment.

As shown in FIG. 25, the present embodiment provides a positioning measurement apparatus, including:

a sending module 251, configured to send measurement assistance information to a serving base station of a terminal, where the measurement assistance information is used by the serving base station to determine a measurement gap of positioning measurement performed by the terminal by using a pre-determined manner.

It should be noted that those skilled in the art can understand that the methods provided by the embodiments of the present disclosure can be executed alone or together with some methods in the embodiments of the present disclosure or some methods in related technologies.

Figure 26:
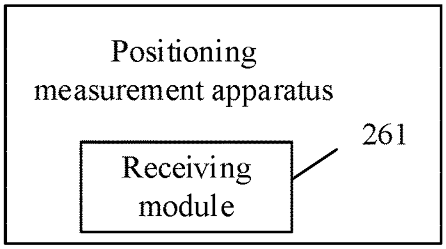
FIG. 26 is a schematic diagram of a positioning measurement apparatus according to an exemplary embodiment.

As shown in FIG. 26, the present embodiment provides a positioning measurement apparatus, including:

a receiving module 261, configured to receive measurement assistance information sent by a positioning server, where the measurement assistance information is used by a base station to determine a measurement gap of positioning measurement performed by a terminal by using a pre-determined manner.

It should be noted that those skilled in the art can understand that the methods provided by the embodiments of the present disclosure can be executed alone or together with some methods in the embodiments of the present disclosure or some methods in related technologies.

Figure 27:
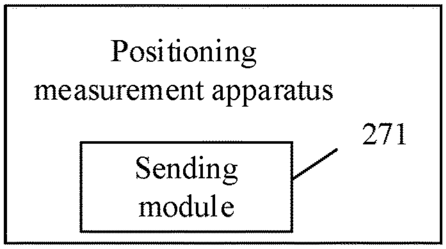
FIG. 27 is a schematic diagram of a positioning measurement apparatus according to an exemplary embodiment.

As shown in FIG. 27, the present embodiment provides a positioning measurement apparatus, including:

a sending module 271, configured to send feedback information to a positioning server, where the feedback information is used to indicate that a terminal supports or does not support performing positioning measurement by using a pre-determined manner; the feedback information includes a cell identifier of a serving base station of the terminal.

It should be noted that those skilled in the art can understand that the methods provided by the embodiments of the present disclosure can be executed alone or together with some methods in the embodiments of the present disclosure or some methods in related technologies.

The embodiments of the present disclosure provide a communication device, including:

a processor; and a memory for storing an instruction executable by the processor;

where the processor is configured to: execute the instruction to implement the method applied to any embodiment of the present disclosure.

The processor can include various types of storage media, which are non-temporary computer storage media, and can maintain remembering the information stored on the communication device after power failure.

The processor can be connected with the memory through a bus or the like for reading the executable program stored on the memory.

The embodiments of the present disclosure further provide a computer storage medium, where the computer storage medium stores a computer-executable program, and the computer-executable program is executed by a processor to implement the method according to any embodiment of the present disclosure.

With regard to the apparatus in the above embodiment, the specific way in which each module performs operations has been described in detail in the embodiments of the method, and will not be described in detail here.

Figure 28:
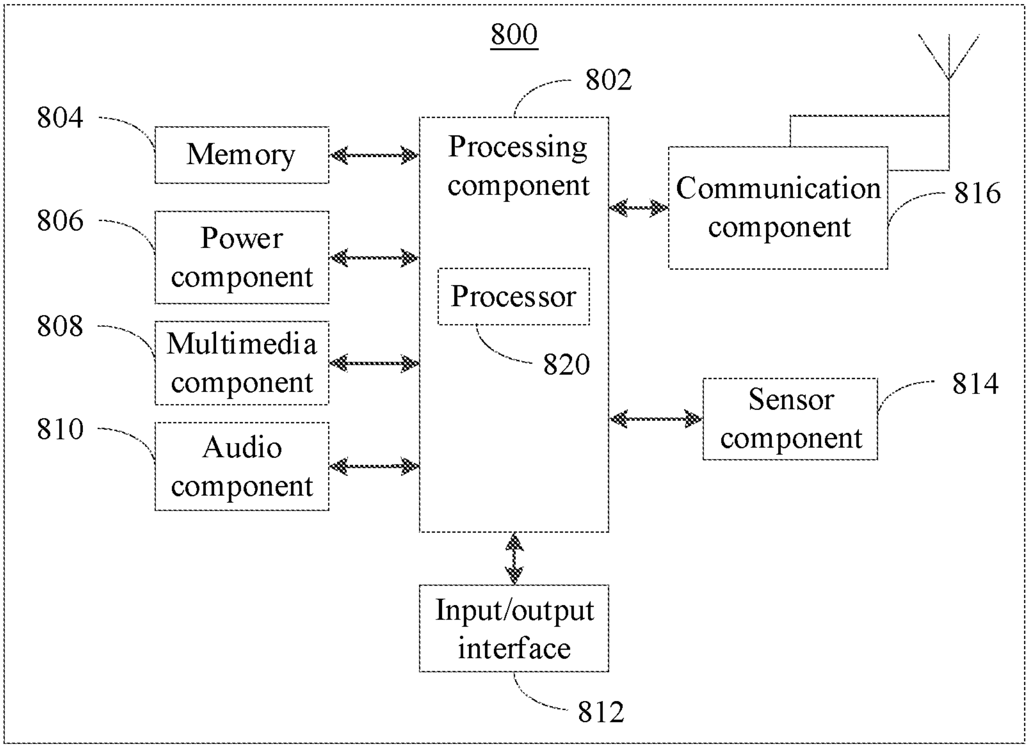
FIG. 28 is a schematic structural diagram of a terminal according to an exemplary embodiment.

As shown in FIG. 28, an embodiment of the present disclosure provides a structure of a terminal.

Referring to a terminal 800 shown in FIG. 28, the present embodiment provides a terminal 800, which can be a mobile phone, a computer, a digital broadcasting terminal, a messaging device, a game console, a tablet device, a medical device, a fitness device, a personal digital assistant and the like.

Referring to FIG. 28, the terminal device 800 may include at least one of the following components: a processing component 802, a memory 804, a power component 806, a multimedia component 808, an audio component 810, an input/output (I/O) interface 812, a sensor component 814, and a communication component 816.

The processing component 802 usually controls overall operations of the terminal device 800, such as operations associated with display, telephone call, data communication, camera operation and recording operation. The processing component 802 may include one or more processors 820 to execute instructions to complete all or part of steps of the method described above. In addition, the processing component 802 can include one or more modules to facilitate interaction between the processing component 802 and other components. For example, the processing component 802 can include a multimedia module to facilitate interaction between the multimedia component 808 and the processing component 802.

The memory 804 is configured to store various types of data to support operations at the device 800. Examples of these data include instructions for any application or method operating on the terminal 800, contact data, phone book data, messages, pictures, videos, and the like. The memory 804 can be realized by any type of volatile or nonvolatile memory device or their combination, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 806 provides power to various components of the terminal 800. The power component 806 may include a power management system, one or more power supply, and other components associated with generating, managing and distributing power for the terminal 800.

The multimedia component 808 includes a screen providing an output interface between the terminal 800 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensor to sense touch, sliding and gestures on the touch panel. The touch sensor may not only sense a boundary of a touch or sliding action, but also detect a duration and pressure related to the touch or sliding operation. In some embodiments, the multimedia component 808 includes a front camera and/or a rear camera. When the terminal 800 is in an operation mode, such as a shooting mode or a video mode, the front camera and/or the rear camera can receive external multimedia data. Each front camera and rear camera can be a fixed optimal lens system or have focal length and optimal zoom capability.

The audio component 810 is configured to output and/or input audio signals. For example, the audio component 810 includes a microphone (MIC) to receive external audio signals when the terminal 800 is in operation modes, such as a call mode, a recording mode and a voice recognition mode. The received audio signal may be further stored in the memory 804 or transmitted via the communication component 816. In some embodiments, the audio component 810 further includes a speaker for outputting audio signals.

I/O interface 812 provides an interface between processing component 802 and peripheral interface modules, which can be keyboards, click-wheels, buttons, etc. These buttons may include, but are not limited to, home button, volume button, start button and lock button.

The sensor component 814 includes one or more sensor for providing various aspects of state evaluation for the terminal 800. For example, the sensor component 814 can detect an ON/OFF state of the terminal 800, the relative positioning of components, such as the display and keypad of the terminal 800, the position change of the terminal 800 or a component of the terminal 800, the presence or absence of user contact with the terminal 800, the orientation or acceleration/deceleration of the terminal 800 and the temperature change of the terminal 800. The sensor component 814 may include a proximity sensor configured to detect the presence of a nearby object without any physical contact. The sensor component 814 may also include an optical sensor, such as a CMOS or CCD image sensor, for use in imaging applications. In some embodiments, the sensor component 814 may further include an acceleration sensor, a gyro sensor, a magnetic sensor, a pressure sensor or a temperature sensor.

The communication component 816 is configured to facilitate wired or wireless communication between the terminal 800 and other devices. The terminal 800 can access a wireless network based on communication standards, such as WiFi, 2G or 3G, or a combination thereof. In an exemplary embodiment, the communication component 816 receives a broadcast signal or broadcast related information from an external broadcast management system via a broadcast channel. In an exemplary embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the terminal 800 can be realized by one or more application specific integrated circuit (ASIC), a digital signal processor (DSP), a digital signal processing device (DSPD), a programmable logic device (PLD), a field programmable gate array (FPGA), a controller, a micro-controller, a microprocessor or other electronic components, and is used for executing the above-described method.

In an exemplary embodiment, there is also provided a non-transitory computer-readable storage medium including instructions, such as the memory 804 including instructions, which can be executed by the processor 820 of the terminal 800 to complete the above method. For example, the non-transitory computer-readable storage medium can be ROM, random access memory (RAM), CD-ROM, magnetic tape, floppy disk, optical data storage device, etc.

Figure 29:
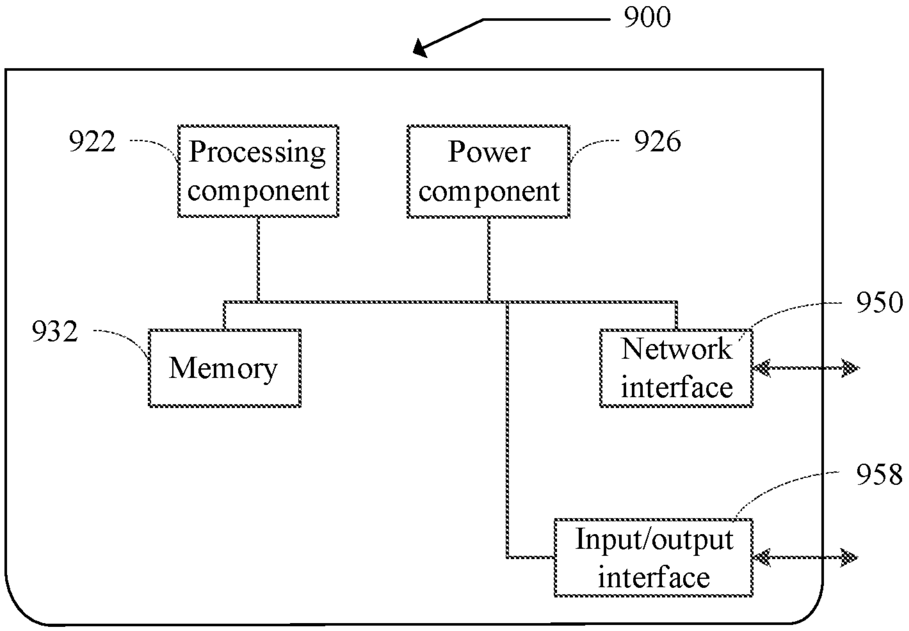
FIG. 29 is a block diagram of a base station according to an exemplary embodiment.

As shown in FIG. 29, an embodiment of the present disclosure provides a structure of a base station. For example, the base station 900 can be provided as a network-side device. Referring to FIG. 29, the base station 900 includes a processing component 922, which further includes one or more processor, and memory resources represented by a memory 932 for storing instructions (such as application programs) executable by the processing component 922. The application program stored in the memory 932 may include one or more modules each corresponding to a set of instructions. In addition, the processing component 922 is configured to execute instructions to perform any of the aforementioned methods applied to the base station, for example, the method for distinguishing paging capability of a base station as shown in FIG. 7.

The base station 900 may further include a power component 926 configured to perform power management of the base station 900, a wired or wireless network interface 950 configured to connect the base station 900 to a network, and an input/output (I/O) interface 958. The base station 900 can operate based on an operating system stored in the memory 932, such as Windows Server™, Mac OS X™, Unix™, Linux™, FreeBSD™ or the like.

Those of ordinary skills in the art will easily think of other embodiments of the present disclosure after considering the specification and practicing the disclosure disclosed herein. The present disclosure is intended to cover any variation, use or adaptation of the present disclosure, which follows the general principles of the present disclosure and includes common sense or common technical means in the technical field not disclosed in this disclosure. The specification and examples are to be regarded as exemplary only.

It should be understood that the present disclosure is not limited to the precise structure described above and shown in the drawings, and various modifications and changes can be made without departing from its scope.

The invention claimed is:

1. A positioning measurement method, performed by a positioning server, comprising:

sending measurement assistance information to a serving base station of a terminal, to cause the serving base station to determine, based on the measurement assistance information, a measurement gap of positioning measurement performed by the terminal by using a pre-determined manner, and send information of the measurement gap to the terminal to cause the terminal to perform the positioning measurement based on the measurement gap, wherein the measurement assistance information comprises: information of the pre-determined manner, the information of the measurement gap, accuracy information of the base station sending a positioning reference signal (PRS) for the positioning measurement, height information of a transmitting point of the base station sending the PRS, and coordinate information of a location of the base station.

2. The method according to claim 1, wherein sending measurement assistance information to the serving base station of the terminal comprises:

sending a provide assistance data message carrying the measurement assistance information to the serving base station.

3. The method according to claim 1, further comprising:

sending request capability information of the positioning measurement to the terminal, wherein the request capability information is used to request that the terminal supports or does not support capability of performing the positioning measurement by using the pre-determined manner.

4. The method according to claim 3, wherein sending request capability information of the positioning measurement to the terminal comprises:

sending a request capability information message carrying the request capability information of the positioning measurement to the terminal.

5. The method according to claim 3, further comprising:

receiving feedback information sent by the terminal in response to the request capability information, wherein the feedback information is used to indicate that the terminal supports or does not support performing the positioning measurement by using the pre-determined manner.

6. The method according to claim 5, wherein receiving feedback information sent by the terminal in response to the request capability information comprises:

receiving a provide capability message carrying the feedback information sent by the terminal in response to the request capability information.

7. The method according to claim 5, wherein the feedback information comprises a cell identifier of the serving base station.

8. The method according to claim 7, wherein the feedback information further comprises at least one of:

information of the supported pre-determined manner;

frequency band information of a supported frequency band; or information of supporting or not supporting the pre-determined manner.

9. The method according to claim 1, wherein the measurement assistance information comprises at least one of measurement reference cell configuration information or adjacent cell configuration information.

10. The method according to claim 1, further comprising:

sending a request location information message of the positioning measurement to the terminal, wherein the request location information message is used to trigger the terminal to perform the positioning measurement by using the pre-determined manner.

11. A communication device, comprising:

a memory; and a processor, connected to an antenna and the memory, wherein the processor is configured to execute a computer-executable instruction stored on the memory to control receiving and transmitting of the antenna, and to implement the method according to claim 1.

12. A non-transitory computer storage medium, storing a computer-executable instruction, wherein the computer-executable instruction is executed by a processor to implement the method according to claim 1.

13. The method according to claim 1, further comprising:

sending the measurement assistance information to the terminal, wherein the measurement assistance information configures the terminal to perform the positioning measurement.

14. A positioning measurement method, performed by a base station, comprising:

receiving measurement assistance information sent by a positioning server;

determining, based on the measurement assistance information, a measurement gap of positioning measurement performed by a terminal by using a pre-determined manner; and sending information of the measurement gap to the terminal to cause the terminal to perform the positioning measurement based on the measurement gap, wherein the measurement assistance information comprises: information of the pre-determined manner, the information of the measurement gap, accuracy information of the base station sending a positioning reference signal (PRS) for the positioning measurement, height information of a transmitting point of the base station sending the PRS, and coordinate information of a location of the base station.

15. The method according to claim 14, wherein receiving measurement assistance information sent by the positioning server comprises:

receiving a provide assistance data message carrying the measurement assistance information sent by the positioning server.

16. The method according to claim 14, further comprising:

determining, according to the measurement assistance information, the measurement gap of the positioning measurement performed by the terminal by using the pre-determined manner.

17. The method according to claim 16, further comprising:

sending configuration information to the terminal, wherein the configuration information at least indicates the measurement gap.

18. The method according to claim 17, wherein sending configuration information to the terminal comprises:

sending a radio resource control (RRC) message carrying the configuration information to the terminal.

19. A positioning measurement method, performed by a terminal, comprising:

receiving information of a measurement gap sent by a base station; and performing positioning measurement based on the information of the measurement gap by using a pre-determined manner;

wherein the measurement gap is determined by the base station based on measurement assistance information sent by a positioning server to the base station, wherein the measurement assistance information comprises: information of the pre-determined manner, the information of the measurement gap, accuracy information of the base station sending a positioning reference signal (PRS) for the positioning measurement, height information of a transmitting point of the base station sending the PRS, and coordinate information of a location of the base station.

20. A communication device, comprising:

a memory; and a processor, connected to an antenna and the memory, wherein the processor is configured to execute a computer-executable instruction stored on the memory to control receiving and transmitting of the antenna, and to implement the method according to claim 19.

* * * * *